United States Patent
Fan et al.

(10) Patent No.: US 10,541,609 B2
(45) Date of Patent: Jan. 21, 2020

(54) FIXED FREQUENCY DC-DC CONVERTER

(71) Applicant: Texas Instruments Incorporated, Dallas, TX (US)

(72) Inventors: Jiwei Fan, Cary, NC (US); Mingyue Zhao, Cary, NC (US); Huy Le Nhat Nguyen, Raleigh, NC (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/040,805

(22) Filed: Jul. 20, 2018

(65) Prior Publication Data

US 2018/0351455 A1 Dec. 6, 2018

Related U.S. Application Data

(63) Continuation of application No. 15/725,767, filed on Oct. 5, 2017, now Pat. No. 10,063,143.

(60) Provisional application No. 62/463,223, filed on Feb. 24, 2017.

(51) Int. Cl.
| | |
|---|---|
| *H02M 3/156* | (2006.01) |
| *H02M 5/458* | (2006.01) |
| *H01F 41/04* | (2006.01) |
| *H01F 27/29* | (2006.01) |
| *H02M 1/00* | (2006.01) |

(52) U.S. Cl.
CPC .......... *H02M 3/156* (2013.01); *H01F 27/292* (2013.01); *H01F 41/04* (2013.01); *H02M 5/458* (2013.01); *H02M 2001/0025* (2013.01)

(58) Field of Classification Search
CPC ... H01H 1/221; H01H 2001/223; H01H 73/04
See application file for complete search history.

(56) References Cited

U.S. PATENT DOCUMENTS

| | | | |
|---|---|---|---|
| 5,982,160 A | 11/1999 | Walters et al. | |
| 8,154,222 B2 | 4/2012 | Korsunsky et al. | |
| 9,225,241 B2 | 12/2015 | Lee | |
| 2010/0019697 A1* | 1/2010 | Korsunsky | H05B 33/0818 315/307 |

FOREIGN PATENT DOCUMENTS

| | | |
|---|---|---|
| EP | 0709948 A1 | 8/2002 |
| RU | 2552520 C2 | 6/2015 |

OTHER PUBLICATIONS

Notification of Transmittal of the International Search Report and the Written Opinion of the International Searching Authority, or the Declaration; dated Jun. 14, 2018, 6 pages.

* cited by examiner

*Primary Examiner* — Adolf D Berhane
*Assistant Examiner* — Afework S Demisse
(74) *Attorney, Agent, or Firm* — Tuenlap Chan; Charles A. Brill; Frank D. Cimino

(57) ABSTRACT

In a power converter system, circuitry generates first and second PWM signals during a PWM cycle for controlling application of power to an inductor. Circuitry generates error signals having AC- and DC-components, the error signals being generated in response to indications of the power applied to or developed by the inductor. Circuitry generates a feedback control signal in response to the error signals. The first and second PWM signals are controlled in response to the feedback control signals.

20 Claims, 13 Drawing Sheets

K CHANGES
FROM 15 TO 50
STEP = 5

V (dB)
FREQ (Hz)

FIXED FREQUENCY DC-DC CONVERTER

CROSS-REFERENCE TO RELATED APPLICATIONS

Under 35 U.S.C. § 120, this continuation application claims benefits of and priority to U.S. patent application Ser. No. 15/725,767 (TI-78136), filed on Oct. 5, 2017, which claims the benefit of U.S. Provisional Patent Application No. 62/463,223, filed Feb. 24, 2017. The entirety of the above referenced applications is hereby incorporated herein by reference for all purposes.

BACKGROUND

Electronic devices are increasingly used in a greater diversity of applications for which switching-type power supplies are called upon to operate more efficiently and effectively over increasingly wider ranges of conditions. The control circuitry for some power supplies is optimized to have a wide stability range. However, the control circuitry optimized for maintaining stability over a wide range of conditions can have a slower ability to respond to fast transients in DC (direct current) loads. In contrast, the control circuitry for power supplies optimized for responding to fast transients can have a lower stability and often emit relatively large amounts of EMI when responding to the fast transients. Accordingly, there is a need to respond quickly to transients while providing relatively stable operation and minimizing EMI emissions.

SUMMARY

In a power converter system, circuitry generates first and second PWM signals during a PWM cycle for controlling application of power to an inductor. Circuitry generates error signals having AC- and DC-components, the error signals being generated in response to indications of the power applied to or developed by the inductor. Circuitry generates a feedback control signal in response to the error signals. The first and second PWM signals are controlled in response to the feedback control signals.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a spectrum diagram of the frequency response of an integrator for directly amplified ramp tracking in accordance with this disclosure.

DETAILED DESCRIPTION

Figure 1:
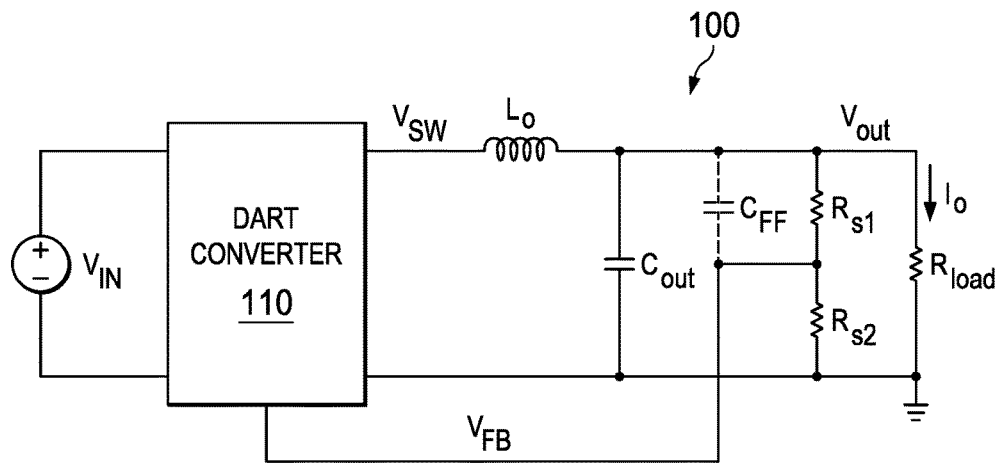
FIG. 1 is a schematic diagram of a directly amplified ramp tracking-controlled Buck converter system in accordance with this disclosure.

DC-to-DC power converters control (e.g., switch on and off) the application of input power to inductive components such that currents greater than the current of the input power can be output. The application of the input power to the inductive components is switched in accordance with a switching frequency, which can be fixed or variable. Fixed-frequency converters include true fixed-frequency converters (in which the switching frequency remains fixed) and pseudo fixed-frequency converters (in which the switching frequency can be changed to respond to transient load conditions).

The DC-to-DC power converters can include compensation circuits for responding to transient load conditions (e.g., where the response is for maintaining a constant output voltage when the applied load changes). Internal compensation circuits can be implemented entirely within the packaging of a DC to DC power converter, whereas external compensation circuits require external components.

Fixed-frequency power converters with internal compensation can operate in accordance with peak current mode control techniques. However, fixed-frequency power converters with internal compensation can be relatively slow in responding to fast transient load conditions. The absence of external compensation components (which are often omitted due to size, cost, and power considerations) can limit the range of stability of the compensation circuits as well as the speed at which the internal loop compensation and slope compensation circuits can respond to fast transient (e.g., quickly changing) load conditions. Further, internally compensated fixed-frequency power converters are often limited to small-load current applications because of difficulties associated with measuring large load currents.

Pseudo-fixed-frequency converters can operate in accordance with constant-on-time (or hysteresis) control of feedback-based phase lock loop (PLL) circuits. The pseudo-fixed-frequency converters also can operate in accordance with internal compensation and/or an external compensation. The internally compensated pseudo-fixed-frequency converters can respond to fast transient load conditions by changing the switching frequency. However, changing the switching frequency normally results in additional radiation of electromagnetic interference (EMI), which can increase electrical noise and degrade signal-to-noise ratios. In compensation circuits designed for wide loop bandwidth operation, changing the switching frequency often induces jitter in the switching frequency, which contributes to emission of EMI.

In portable applications (such as handheld or automotive applications), relatively high switching frequencies are used to reduce the size and weight of fixed-frequency power converters. However, the switching speed of fixed-frequency converters can be limited by switching noise and architectural limitations. For example, latency results from the noise-blanking time for high-current/low-$R_{dson}$ (on-resistance drain-to-source) sensing, loop comparator response times, and driver (e.g., for switching the input power) propagation delays. Such latencies tend to limit the overall frequency at which a converter can operate. The limitations on the overall frequency can limit the switching frequency of the fixed-frequency converter to less than around 3 MHz, for example.

In contrast, directly amplified ramp tracking (DART) control for fixed-frequency operation of power converters described herein permit true fixed-frequency power converter operation for responding to fast transient load conditions while relying upon internal compensation controls even at relatively high load currents. Fixed-frequency power converters operating in accordance with the described DART control methods can operate at high switching frequencies greater than around 3 or 4 MHz, for example.

FIG. 1 is a schematic diagram of an example directly amplified ramp tracking-controlled Buck converter system in accordance with this disclosure, generally as 100. In FIG. 1, the DART converter 110 is an internally compensated controller for controlling the operation of the Buck converter system 100.

In operation, the DART converter 110 receives input power from the input signal $V_{IN}$. The DART converter 110 generates the switched output power signal $V_{SW}$ in response to the input signal $V_{IN}$ and in response to a feedback voltage signal $V_{FB}$. The switched output power signal $V_{SW}$ is arranged for regulating a generated output voltage $V_{out}$. The switched output power signal $V_{SW}$ is coupled to a first terminal of a coil $L_O$. The coil $L_O$, for example, is an inductor for converting the voltage of the switched output power signal $V_{SW}$ to a second voltage at the second terminal of the coil $L_O$.

The second voltage output at the second terminal of the coil $L_O$ is low-pass filtered by capacitor $C_{out}$ to generate the output voltage $V_{out}$. The load $R_{load}$ receives a current $I_O$ at the regulated output voltage $V_{out}$. However, the load $R_{load}$ dynamically varies (such as when generating fast transient load conditions), which changes the voltage of $V_{out}$. The voltage divider formed by the series of $R_{s1}$ and $R_{s2}$ generates the signal $V_{FB}$ (at a center node) for providing an indication of the changes in the voltage of $V_{out}$. An optional feedforward capacitor $C_{FF}$ can be coupled in parallel with $R_{s1}$ to increase the slew rate of the indication of the changes in the voltage of $V_{out}$ to control circuitry (discussed below with reference to FIG. 2, for example) within the DART converter 110.

Accordingly, the DART converter 110 can operate with or without external compensation components and can regulate the voltage of $V_{out}$ using (e.g., only) one voltage-regulation control-loop input pin (e.g., used for coupling the externally generated feedback voltage $V_{FB}$, which can lower packaging costs). Reducing the number of external components required can reduce system costs and overall size. The reduction of the required external components also can simplify the end-use design of a packaged DART converter 110.

Figure 2:
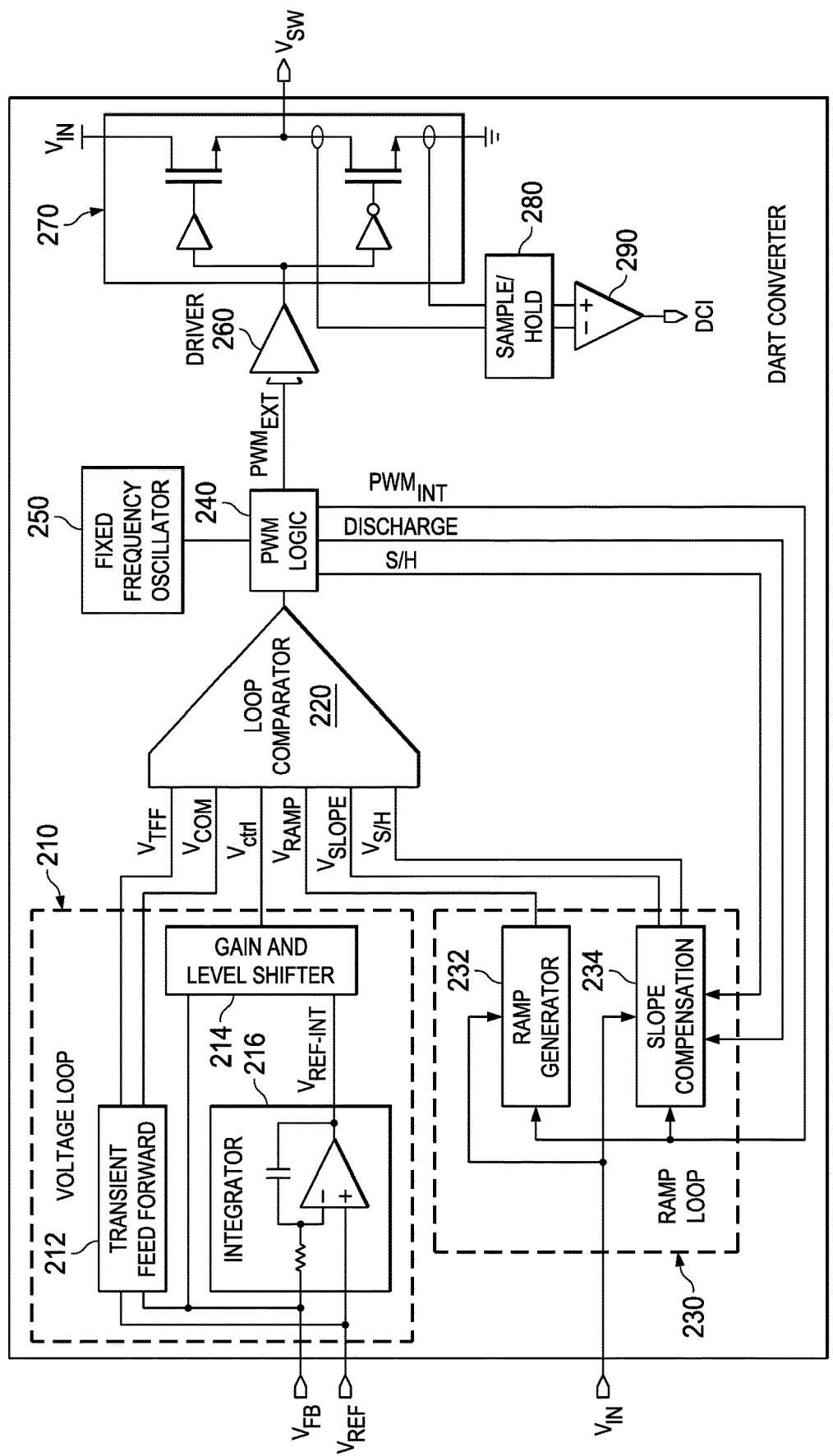
FIG. 2 is a schematic diagram of a directly amplified ramp tracking converter in accordance with this disclosure.

FIG. 2 is a schematic diagram of an example directly amplified ramp tracking converter in accordance with this disclosure, generally as 200. In FIG. 2, an example DART converter 200 (which is similar to the DART converter 110) is generally described as including a voltage loop 210 circuit, a loop comparator 220, a ramp loop 230 circuit, a PWM logic 240 circuit, a fixed frequency oscillator 250, a driver 260, a switching circuit 270, a sample/hold 280 circuit, and a DC-current feedback indicator generator 290. The components of the DART converter 200 can be formed on a single substrate (e.g., coextensive with 200). Alternatively, converter 200 can be implemented with a DART controller integrated circuit (IC) and an external switching circuit 270 (i.e., external switching transistors), with the DART controller IC including a driver output terminal for driving the switching circuit).

The voltage loop 210 circuit and the ramp loop 230 circuit each are arranged to separately optimize the AC (alternating current) and DC (direct current) components of control signals for internally generating a feedback control signal (e.g., presented at the output of the loop comparator 220). The control signals are coupled for controlling the switching of an external inductor (e.g., via the output signal $V_{SW}$).

The example voltage loop 210 circuit is responsive to the externally generated $V_{FB}$ signal to generate DC-component control signals and AC-component control signals for generating the feedback control signal of loop comparator 220. The voltage loop 210 circuit includes a DC portion optimized for generating higher gain and very slow slew rate control signals (e.g., the $V_{REF-INT}$ and the $V_{ctrl}$ signals, discussed below). The voltage loop 210 circuit also includes an AC portion for generating high slew rate and relatively limited gain control signals (e.g., a voltage feedforward VTFF signal, also discussed below).

The voltage loop 210 circuit includes a transient feedforward 212 circuit, a gain and level shifter 214, and an integrator 216. In general, the voltage loop 210 circuit compares the feedback voltage signal $V_{FB}$ with the voltage reference signal $V_{REF}$ for generating control signals (e.g., $V_{TFF}$, $V_{COM}$, and $V_{ctrl}$) for input to the loop converter 220.

The transient feedforward 212 circuit generates the signals $V_{TFF}$ and $V_{COM}$ in response to the signals $V_{FB}$ and $V_{REF}$. The transient feedforward 212 circuit compares $V_{FB}$ and $V_{REF}$ to generate a first error signal for indicating a high-frequency difference between the $V_{FB}$ and $V_{REF}$ signals. The first error signal is amplified with a fixed gain of around 500 percent through around 1000 percent. The first amplified error signal is high-pass filtered to generate the $V_{TFF}$ signal. The transient feedforward block to improves the response of the DART converter 200 to fast transient load conditions by quickly providing high-frequency information to the loop comparator 200 for immediate processing. The transient feedforward 212 circuit is further described with reference to FIG. 6A, FIG. 6B, and FIG. 6C below.

The signal $V_{COM}$ is a DC voltage reference signal, which can be generated by a voltage divider to generate a voltage between the high and low analog power rails. When the generated voltage is halfway between (e.g., the average of) the high and low analog power rails, the dynamic ranges of signals generated in comparison with the signal $V_{COM}$ are optimized.

The integrator 216 integrates the difference between $V_{FB}$ and $V_{REF}$, and generates the signal $V_{REF-INT}$. The integrator 216 operates in accordance with a long time constant for reducing (if not virtually eliminating) DC output voltage errors in a system (such as system 100). For example, a drop in the $V_{FB}$ signal causes the signal $V_{REF-INT}$ to rise in accordance the time constant determined in response to an input resistor (e.g., 5 MOhms) and feedback capacitor (e.g., 20 pF).

The gain and level shifter 214 generates the $V_j$ signal in response to the $V_{FB}$ and the $V_{REF-INT}$ signals. The gain and level shifter 214 senses the difference between the VF and the $V_{REF-INT}$ signals to generate a second error signal (e.g., which increases in response to a decrease in VF voltage). The second error signal is amplified with a fixed gain of around 500 percent through around 1000 percent. The second amplified error signal is normalized (e.g., level-shifted) based on a fixed common voltage to generate the $V_{ctrl}$ signal for output.

The gain and level shifter 214 is further described with reference to FIG. 5A, FIG. 5B, and FIG. 5C below.

The ramp loop 230 circuit is responsive to the input voltage $V_{IN}$ signal to generate DC-component control signals and AC-component control signals for generating the feedback control signal. The ramp loop 230 circuit includes an AC-component portion for generating a first error signal (of the ramp loop 230 circuit) for increasing the stability of loop feedback and minimize switching jitter. The ramp loop 230 circuit also includes a DC-component portion optimized for generating a second error signal for slope compensation. The second error signal includes a low DC-offset, which reduces the speed requirement of the integration of the second error signal.

The ramp loop 230 circuit includes a ramp generator 232 and the slope compensation 234 circuit. The ramp loop 230 circuit generates a ramp voltage signal $V_{RAMP}$ in response to $V_{IN}$ and the $PWM_{INT}$ (signals $V_{RAMP}$ and $PWM_{INT}$ are discussed below with reference to FIG. 11-FIG. 15, for example). The slope compensation functionality can also be provided when the duty cycle of $PWM_{INT}$ is greater than 50 percent.

The ramp generator 232 changes the ramp slope of $V_{SLOPE}$ based on the voltage $V_{IN}$ (e.g., the signal $V_{SLOPE}$ is discussed below with reference to FIG. 11). The voltage $V_{IN}$ is an indication of the power applied to the switched inductor. When the signal $PWM_{INT}$ is high, the signal $V_{RAMP}$ rises to a peak amplitude (during a rising edge). When the signal $PWM_{INT}$ is low, the signal $V_{RAMP}$ falls (during a falling edge).

The slope compensation 234 circuit generates the of $V_{SLOPE}$ and the $V_{S/H}$ signals. The $V_{SLOPE}$ signal is a sawtooth waveform having a rising slope of around 80 mV/μsec and a near vertical falling slope. The $V_{S/H}$ signal is generated in response to the DISCHARGE and S/H signals generated by the PWM logic 240 circuit. As described below with reference to FIG. 7, the $V_{RAMP}$ is low-pass filtered to generate $V_{SLOPE}$, and $V_{SLOPE}$ is sampled each PWM cycle in response to the S/H signal for generating the $V_{S/H}$ signal.

The ramp loop 230 circuit (and the ramp generator 232 and the slope compensation 234 circuit) are further described with reference to FIG. 7 below.

The loop comparator 220 combines each input signal (e.g., each error signal) and generates the feedback control signal for indicating when a PWM cycle is to be terminated. The indication for terminating the PWM cycle is asserted when the sum of positive inputs to the loop comparator 220 is higher than the sum of the negative inputs to the loop comparator 220. The operation of the loop comparator 220 is discussed below with regards to FIG. 9.

The PWM logic 240 circuit is responsive to the feedback control signal for indicating when a PWM cycle is to be terminated. The PWM logic 240 circuit generates the $PWM_{INT}$ signal (an "internal" PWM signal for controlling the ramp generator 232) and generates the $PWM_{EXT}$ signal (an "external" PWM signal for controlling the Driver 260). The $PWM_{INT}$ signal and the $PWM_{EXT}$ signal are generated responsive to a system clock (generated by the fixed-frequency oscillator 250) and the indication for terminating the PWM cycle output by the loop comparator 220 (e.g., the feedback control signal). The PWM logic 240 circuit is further described with reference to FIG. 10 below.

The (e.g., fixed-frequency) oscillator 250 is arranged to generated a (e.g., fixed-frequency) clock signal. The control signals generated by the PMW logic 240 circuit are synchronized with respect to the clock signal. Although electrical noise (e.g., EMI) is generated by changing the frequency of the oscillator 250, implementations are contemplated in which the operating frequency of the oscillator can be changed (e.g., such that the frequency of the clock signal can be changed). In various examples, DART converters can be used in response to external and/or pseudo-fixed-frequency oscillators although higher EMI levels can ensue.

The switching circuit 270 is responsive to the $PWM_{EXT}$ signal to source (e.g., apply) current through the high side transistor for energizing an external coil (e.g., coil $L_O$ of FIG. 1, which is coupled to node $V_{SW}$) and to source current through the low side transistor for de-energizing the external coil. In a continuous mode of operation, the current in the coil does not reach a zero level at any point of a PWM switching cycle. The switching circuit 270 circuit is further described with reference to FIG. 8 below.

The current sourced through the low side transistor of switching circuit 270 can be measured to provide an indication of the current load (e.g., current $I_O$ of FIG. 1). The sample/hold 280 circuit is arranged to sample the voltage developed across the lower transistor during a noise-blanking time. The sampled voltage is voltage developed drain-to-source across the lower transistor in accordance with the $R_{dson}$ (on-resistance drain-to-source) of the lower transistor. The sample/hold circuit is arranged to maintain the sampled voltage as a constant during each PWM switching cycle. The DC-current feedback indicator generator 290 is arranged to generate signal DCI (direct current indication). The signal DCI can be used by the loop comparator 220 for generating the indication for terminating the PWM cycle (as discussed below with reference to FIG. 9).

Figure 3:
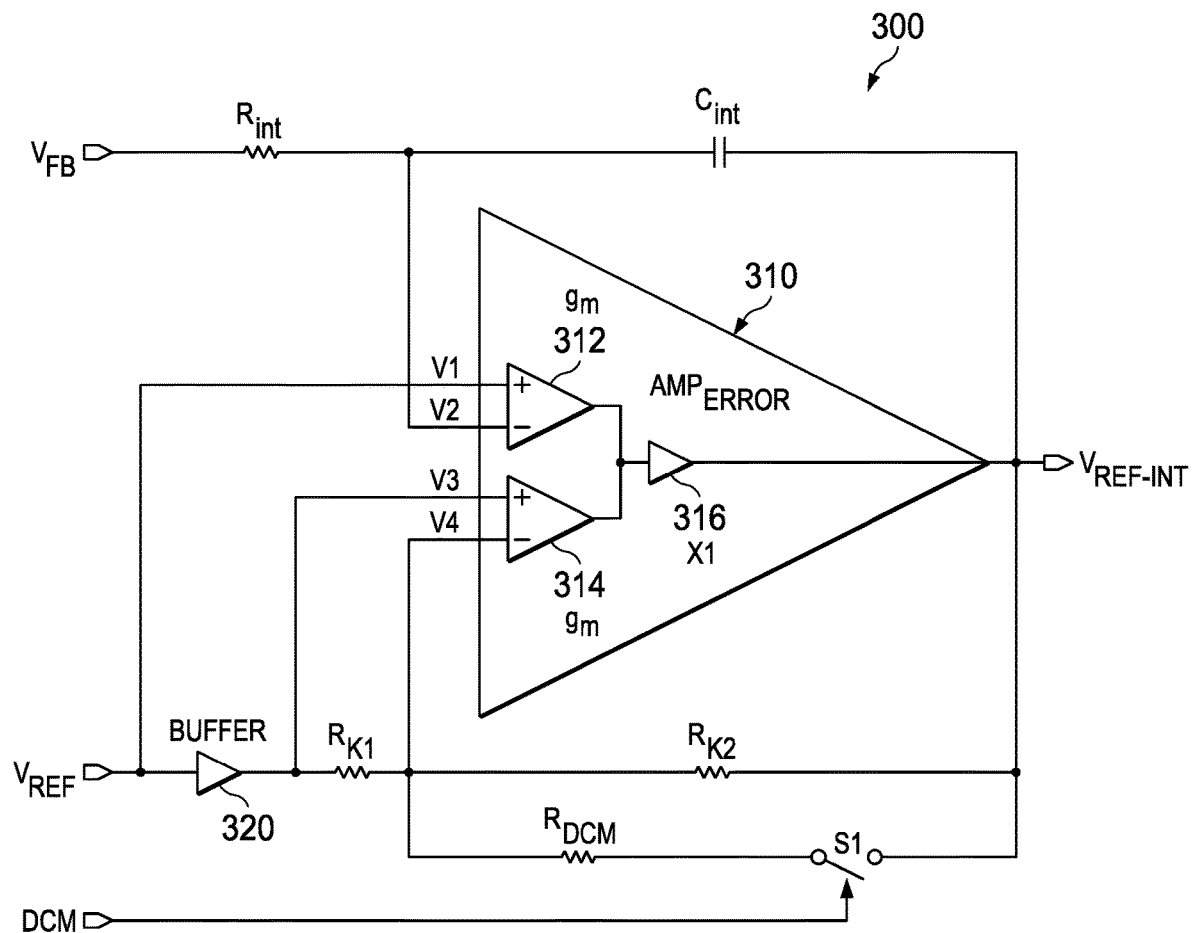
FIG. 3 is a schematic diagram of an integrator for directly amplified ramp tracking in accordance with this disclosure.

FIG. 3 is a schematic diagram of an example integrator for directly amplified ramp tracking in accordance with this disclosure, generally as 300. In FIG. 3, an example integrator 300 (which is similar to the integrator 216) is generally described as including a differential difference amplifier 310 (AMP$_{ERROR}$). The differential difference amplifier 310 includes a first g$_m$ (transconductance) amplifier 312 and a second g$_m$ amplifier 314. The outputs of the first g$_m$ amplifier 312 and the second g$_m$ amplifier 314 are summed together and buffered by unity gain buffer 316 (X1). The output of the buffer 316 is the output signal V$_{REF-INT}$ of the differential difference amplifier 312.

The differential difference amplifier 310 is arranged as a four-input error amplifier arranged as an integrator. The first g$_m$ amplifier 312 includes a non-inverting input V1 and an inverting input V2. The first g$_m$ amplifier 312 integrates the difference of the feedback voltage V$_{FB}$ and the reference voltage V$_{REF}$ in response to the resistor R$_{int}$ (integrator resistor) and the capacitor C$_{int}$ (integrator capacitor) and the output of the differential difference amplifier 310.

The second g$_m$ amplifier 314 includes a non-inverting input V3 and an inverting input V4. The second g$_m$ amplifier 314 controls the gain of the integration in response to the reference voltage V$_{REF}$ (coupled to the node V3 via buffer 320) and in response to a feedback resistor network including resistors R$_{K1}$, R$_{K2}$, and R$_{DCM}$. The buffer 320 isolates the V$_{REF}$ signal from the loading of R$_{K1}$ and R$_{k2}$. The resistor R$_{DCM}$ is selectively coupled in parallel with resistor R$_{K2}$ in response to the selection signal DCM. The selection signal DCM is asserted during discontinuous mode operation for reducing the feedback resistance R$_{K2}$ to reduce the gain of the integration result V$_{REF-INT}$. Reducing the gain of the integrator 300 helps, for example, to prevent saturation of the integrator 300 in the event of a long period that occurs when a power stage is tri-stated.

In various examples in which the DCM function is not required, the DCM selection signal terminal can be eliminated such that the resistor R$_{k2}$ is constant and the integrator 300 has a fixed gain.

The differential difference amplifier 310 includes the V1, V2, V3, and V4 inputs, such that:

$$V_1 - V_2 = V_4 - V_3 \quad (1)$$

and, solving for V$_4$:

$$V_4 = 2V_{REF} - V_2 \quad (2)$$

For V$_2$ and V$_4$, respectively:

$$\frac{V_{REF-int} - V_2}{1/sC_{int}} = \frac{V_2 - V_{FB}}{R_{int}} \quad (3)$$

$$\frac{V_{REF-int} - V_4}{R_{K_2}} = \frac{V_4 - V_{REF}}{R_{K_1}} \quad (4)$$

Accordingly, the AC response (e.g., transfer function) of integrator 300 is:

$$V_{REF-int} = V_{REF} \cdot \frac{s + \frac{k \cdot (V_{REF} - V_{FB}) + V_{REF}}{(k+1) \cdot V_{REF} \cdot C_{int} R_{int}}}{s + \frac{1}{(k+1) \cdot C_{int} R_{int}}} \quad (5)$$

where, $$k = \frac{R_{K_2} + R_{K_1}}{R_{K_1}} \quad (6)$$

and s is a Laplacian operator.

Figure 4:
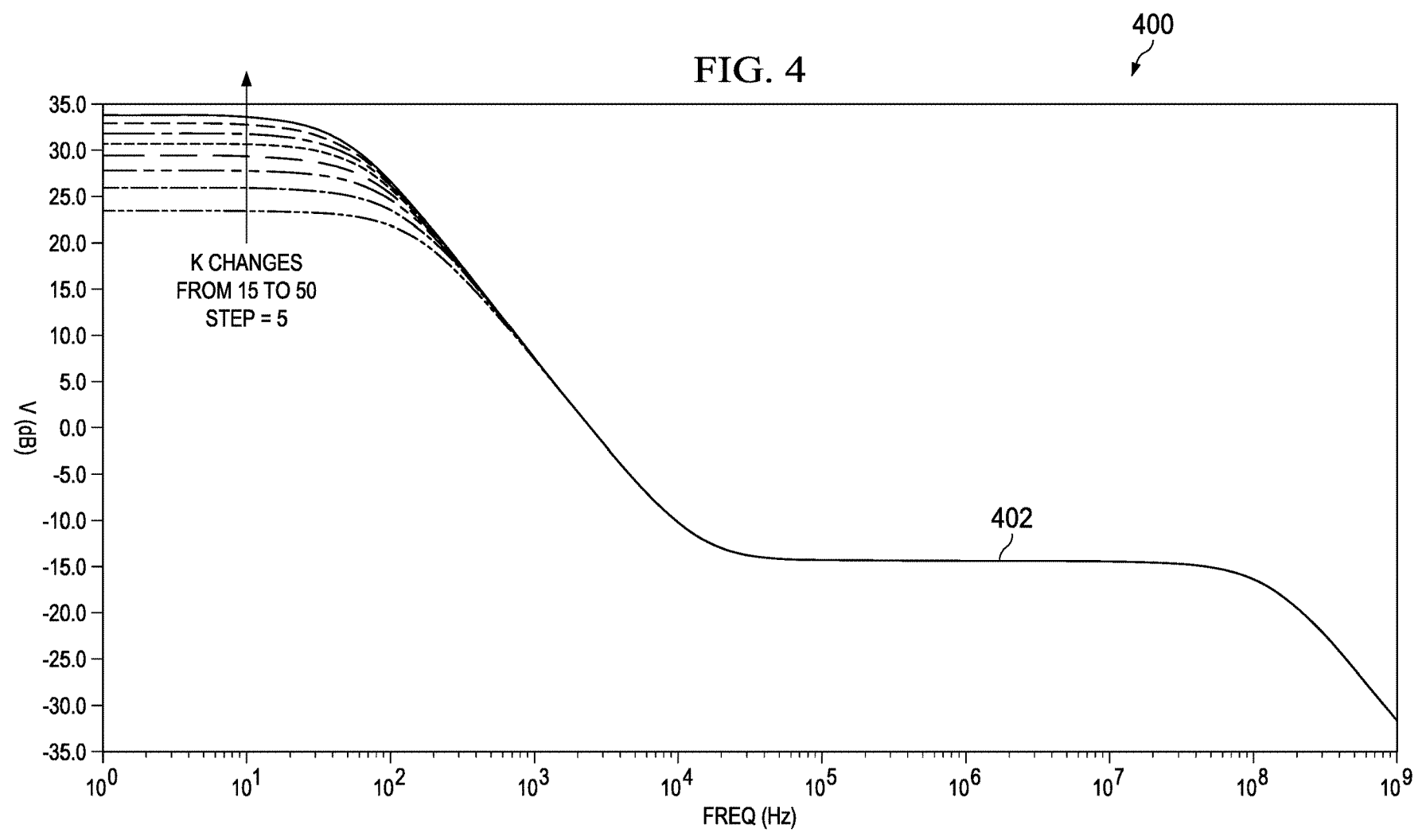

FIG. 4 is an example spectrum diagram of the frequency response of an integrator for directly amplified ramp tracking in accordance with this disclosure. FIG. 4 shows a spectrum diagram, generally as 400. Plot 402 shows gain (e.g., in dB) over frequency (e.g., DC through 1 GHz). The gain at low frequencies (e.g., around 10 Hz) varies from around 23 dB for a value k of 15 up to around 34 dB for a value k of 50, where k is the ratio of the output resistor R$_{k2}$ to the input resistor R$_{K1}$ of the integrator 300.

The DC gain of the integrator 300 is a function of k, which is determined in accordance with the values of resistors R$_{k1}$ and R$_{k2}$. The value of k is select to provide a sufficient (but not excessive) amount of gain for offsetting system losses without excessive gain (which otherwise might increase interference with a main fast control loop). The "zero" of the integrator transfer function helps to enhance the stability of the feedback loop of a DART controller.

In a hysteresis control example (e.g., in PLL pseudo-fixed-frequency converters), the location of the "pole" of the integrator 300 is selected to be sufficiently low so as to not interfere with the fast loop of the feedback controller. The pole location of the integrator 300 is minimized in accordance with a relatively small input capacitor C$_{int}$, in conjunction with the Miller effect (e.g., parasitic capacitance input to output). The pole location can be expressed as:

$$\frac{1}{(k+1) \cdot C_{int} R_{int}} \quad (7)$$

Figure 5A:
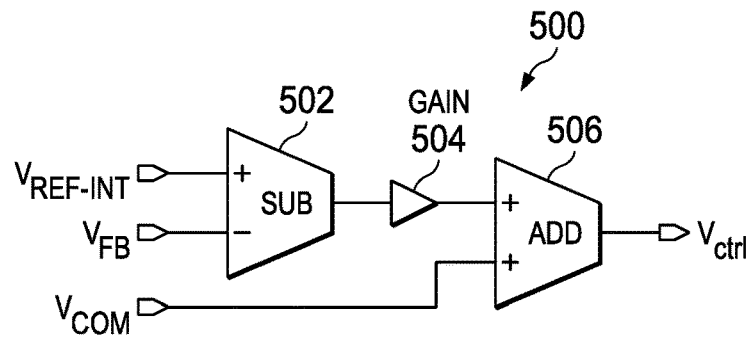
FIG. 5A is a functional diagram of a gain and level shifter for directly amplified ramp tracking in accordance with this disclosure.

FIG. 5A is a functional diagram of an example gain and level shifter for directly amplified ramp tracking in accordance with this disclosure. FIG. 5A shows a V$_{ctrl}$ signal generator, generally as 500. The V$_{ctrl}$ signal generator 500 is similar to the gain and level shifter 214. The V$_{ctrl}$ signal generator 500 includes a subtractor (SUB) 502 for determining a difference (e.g., which is an error signal) between the signal V$_{REF-INT}$ and the signal V$_{FB}$. The gain buffer 504 is arranged to normalize the output of the subtractor 502 for addition with the signal V$_{COM}$. The signal V$_{COM}$ is a constant signal which is the average of (e.g., "in common with") the analog high power rail (e.g., AVDD) and the analog low power rail (e.g., analog ground). The adder 506 is arranged to generate the V$_{ctrl}$ signal in response to adding the signal V$_{COM}$ to the normalized output of the gain buffer 504.

Figure 5B:
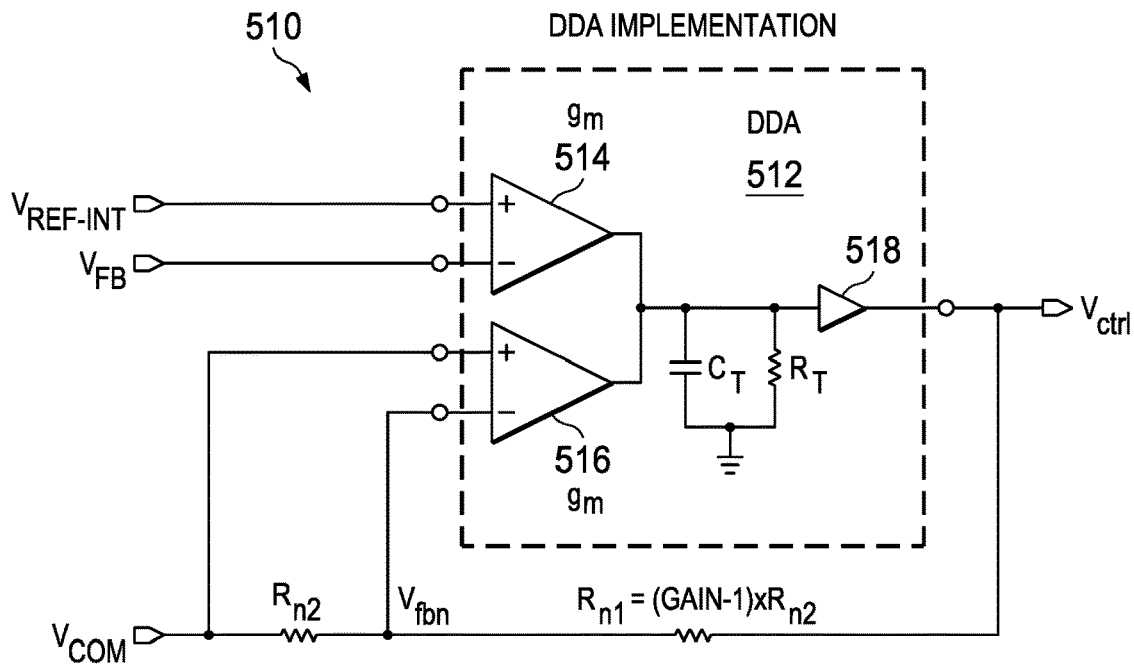
FIG. 5B is a schematic diagram of a differential difference amplifier-based gain and level shifter for directly amplified ramp tracking in accordance with this disclosure.
Figure 5C:
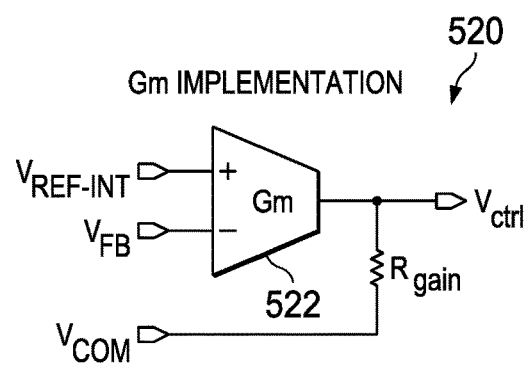
FIG. 5C is a schematic diagram of a transconductance-based gain and level shifter for directly amplified ramp tracking in accordance with this disclosure.

In various examples, the V$_{ctrl}$ signal generator 500 can be a differential difference amplifier (e.g., see DDA 510 of FIG. 5B) or a g$_m$ amplifier (e.g., transconductance, e.g., g$_m$ amplifier 510 of FIG. 5C). In general, a DDA includes a low output impedance and an accurate gain control but entails higher costs and consumes a higher bias current. In contrast, a g$_m$ amplifier entails lower implementation costs and includes a higher bandwidth but also includes a higher output impedance.

The V$_{ctrl}$ signal generator 500 generates the V$_{ctrl}$ signal for controlling the DART converter 110, which in turn controls the Buck converter system 100. When the Buck converter system 100 does not include additional (e.g., internal) control circuits (e.g., which further load the output of the V$_{ctrl}$ signal), the V$_{ctrl}$ signal generator does not necessarily require a low output impedance. In such a case, the g$_m$ amplifier example can be selected for reasons of lower costs and lower power consumption. When the Buck converter system 100 does include additional control circuits the DDA example can be selected for reasons of lower costs and lower power consumption.

FIG. 5B is a schematic diagram of an example differential difference amplifier-based gain and level shifter for directly amplified ramp tracking in accordance with this disclosure. FIG. 5B shows a differential difference amplifier circuit, generally as 510. The differential difference amplifier circuit 510 is a DDA-implemented example of the $V_{ctrl}$ signal generator 500. The differential difference amplifier circuit 510 includes DDA 512, which includes $g_m$ amplifiers 514 and 516, capacitor $C_T$, resistor $R_T$, and buffer 518.

The buffer 518 is a low impedance output buffer for sufficiently driving the signal $V_{ctrl}$ for overcoming injection of EMI-based noise. The signal $V_{ctrl}$ is coupled to a gain-control resistor network including a first resistor $R_{N1}$ and a second resistor $R_{N2}$. The resistor-based feedback helps ensure accurate gain control. The capacitor $C_T$ and the resistor $R_T$ provide compensation for helping to ensure stability for the feedback loop architecture.

The $g_m$ amplifiers 514 and 516 can draw a large quiescent current and are relatively costly. The $g_m$ amplifier 514 includes a non-inverting input coupled to $V_{REF-INT}$ and an inverting input coupled to $V_{FB}$. The $g_m$ amplifier 516 includes a non-inverting input coupled to $V_{COM}$ and an inverting input coupled to $V_{Ffbn}$.

The signal $V_{fbn}$ (resistive network "n" feedback voltage) is generated at the common node of the first resistor $R_{N1}$ and a second resistor $R_{N2}$ in response to the resistive network, signal $V_{COM}$ and signal $V_{ctrl}$. The outputs of the $g_m$ amplifiers 514 and 516 are commonly coupled such that the feedback loop formed by $R_{N1}$ and $R_{N2}$ for both outputs are equal to each other. Accordingly:

$$Vfbn - V_{COM} = V_{REF-INT} - V_{FB} \quad (8)$$

Moreover, $V_{ctrl}$ can be expressed as:

$$Vctrl = \frac{R_{n2} + R_{n1}}{R_{n2}}(V_{REF-INT} - V_{FB}) + V_{COM} \quad (9)$$

FIG. 5C is a schematic diagram of an example transconductance-based gain and level shifter for directly amplified ramp tracking in accordance with this disclosure. FIG. 5C shows a $g_m$ amplifier circuit, generally as 520, which includes $g_m$ amplifier 520 and resistor $R_{gain}$. The $g_m$ amplifier 520 is a $g_m$ amplifier-implemented example of the $V_{ctrl}$ signal generator 500.

In comparison with the differential difference amplifier circuit 510, the $g_m$ amplifier 520 can be implemented at a lower cost and having a lower quiescent power consumption. The gain of the $g_m$ amplifier circuit 520 is determined by the $g_m$ amplifier 522 and the resistor $R_{gain}$. The transconductance output is the voltage developed across the (e.g., fixed) resistor $R_{gain}$, where the transconductance output is proportional to $1/R_{gain}$. Accordingly, the total gain for the output signal $V_{ctrl}$ is well controlled by the resistor $R_{gain}$, and can be expressed as:

$$Vctrl = Gm \cdot Rgain \cdot (V_{REF-NT} - V_{FB}) + V_{COM} \quad (10)$$

The $g_m$ amplifier circuit 520 output impedance is the output impedance of $g_m$ amplifier 522 in parallel with the resistor $R_{gain}$. Accordingly, an extra output buffer can be used to support additional line loading of the signal $V_{ctrl}$ when loaded down by inputs of additional circuits.

Figure 6A:
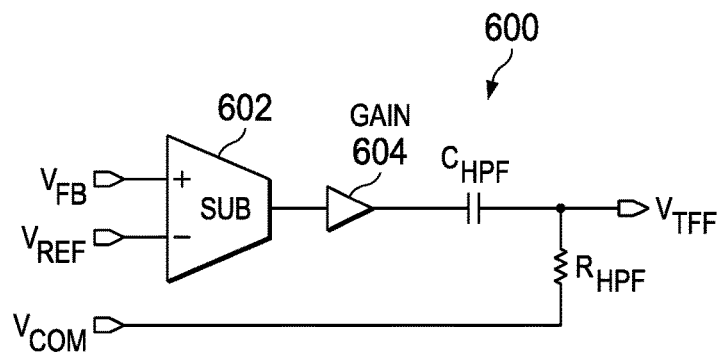
FIG. 6A is a functional diagram of a transient feedforward circuit for directly amplified ramp tracking in accordance with this disclosure.

FIG. 6A is a functional diagram of an example transient feedforward circuit for directly amplified ramp tracking in accordance with this disclosure. FIG. 6A shows a $V_{TFF}$ (transient feedforward voltage) signal generator, generally as 600. The $V_{TFF}$ signal generator 600 is similar to the transient feedforward 212 circuit. The $V_{TFF}$ signal generator 600 includes a subtractor (SUB) 602 for determining a difference (e.g. which is a) between the signal $V_{FB}$ and the signal $V_{REF}$.

The gain buffer 604 is arranged to buffer the output of the subtractor 602 for high-pass filtering performed by capacitor $C_{HPF}$ and resistor $R_{HPF}$. The gain buffer 604 output is coupled to a first terminal of the capacitor $C_{HPF}$, of which the second terminal is coupled to a first terminal of the resistor $R_{HPF}$. The second terminal of the resistor $R_{HPF}$ is coupled to the signal $V_{COM}$. The signal $V_{TFF}$ signal is developed at the common node between the capacitor $C_{HPF}$ and the resistor $R_{HPF}$.

The signal $V_{TFF}$ signal can be expressed as:

$$V_{TFF} = \text{Gain} \cdot (V_{FB} - V_{REF-INT}) \cdot \frac{R_{HPF}}{R_{HPF} + \frac{1}{s \cdot C_{HPF}}} \quad (11)$$

Figure 6B:
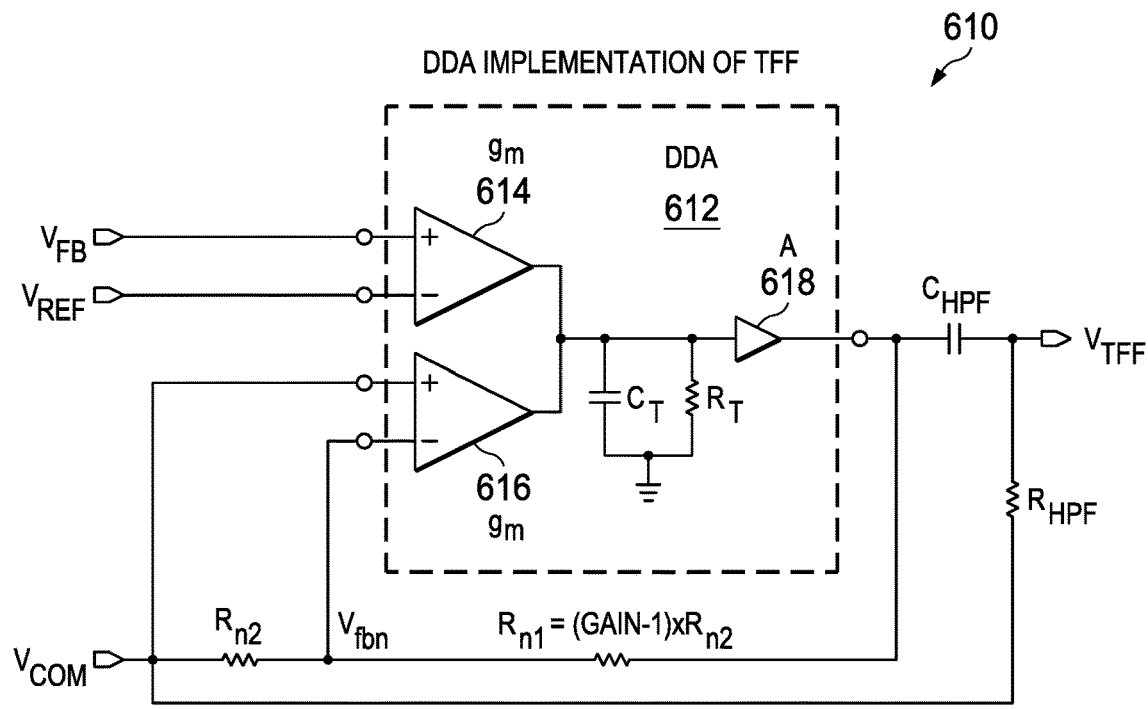
FIG. 6B is a schematic diagram of a differential difference amplifier-based transient feedforward circuit for directly amplified ramp tracking in accordance with this disclosure.

FIG. 6B is a schematic diagram of an example differential difference amplifier-based transient feedforward circuit for directly amplified ramp tracking in accordance with this disclosure. FIG. 6B shows a differential difference amplifier circuit, generally as 610. The differential difference amplifier circuit 610 is a DDA-implemented example of the $V_{TFF}$ signal generator 600. The differential difference amplifier circuit 610 includes DDA 612, which includes $g_m$ amplifiers 614 and 616, capacitor $C_T$, resistor $R_T$, and buffer 618.

The buffer 618 is a low impedance output buffer for driving the signal $V_{TFF}$ sufficiently for overcoming injection of EMI-based noise. The buffer 618 is arranged to buffer the output of the $g_m$ amplifiers 614 and 616 (and compensation network capacitor $C_T$ and resistor $R_T$) for high-pass filtering performed by capacitor $C_{HPF}$ and resistor $R_{HPF}$. The buffer 618 output is coupled to a first terminal of the capacitor $C_{HPF}$, which includes a second terminal coupled to a first terminal of the resistor $R_{HPF}$. The second terminal of the resistor $R_{HPF}$ is coupled to the signal $V_{COM}$. The signal $V_{TFF}$ signal is developed at the common node between the capacitor $C_{HPF}$ and the resistor $R_{HPF}$.

The $g_m$ amplifiers 614 and 616 can draw a large quiescent current and are relatively costly. The $g_m$ amplifier 614 includes a non-inverting input coupled to $V_{FB}$ and an inverting input coupled to $V_{REF}$. The $g_m$ amplifier 616 includes a non-inverting input coupled to $V_{COM}$ and an inverting input coupled to the common node ($V_{fbn}$) between resistors $R_{n2}$ and $R_{n1}$.

The signal $V_{fbn}$ (feedback voltage "n") is generated at the common node of the first resistor $R_{n1}$ and a second resistor $R_{n2}$ in response to the resistive network, signal $V_{COM}$ and signal $V_{fbn}$. The outputs of the $g_m$ amplifiers 614 and 616 are commonly coupled such that the feedback loop formed by $R_{n1}$ and $R_{n2}$ for both outputs is driven by the same node. Accordingly, the gain of the differential difference amplifier circuit 610 can be expressed as:

$$R_{n1} = (\text{GAIN} - 1) \times R_{n2} \quad (12)$$

Figure 6C:
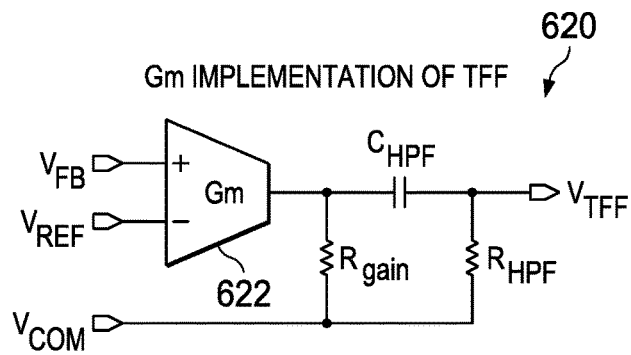
FIG. 6C is a schematic diagram of a transconductance-based transient feedforward circuit for directly amplified ramp tracking in accordance with this disclosure.

FIG. 6C is a schematic diagram of an example transconductance-based transient feedforward circuit for directly amplified ramp tracking in accordance with this disclosure. FIG. 6C shows a $g_m$ amplifier circuit, generally as 620, which includes $g_m$ amplifier 622, resistor $R_{gain}$, capacitor $C_{HPF}$, and resistor $R_{HPF}$. The $g_m$ amplifier 620 is a $g_m$ amplifier-implemented example of the $V_{TFF}$ signal generator 600.

In comparison with the differential difference amplifier circuit 610, the $g_m$ amplifier 620 can be implemented at a lower cost and having a lower quiescent power consumption. The transfer function of the $g_m$ amplifier circuit 620 is determined by the gain of the $g_m$ amplifier 622 and the resistor $R_{gain}$, as well as the high-pass filter (formed by the capacitor $C_{HPF}$ and the resistor $R_{HPF}$). Accordingly, the output of the $g_m$ amplifier circuit 620 can be expressed in accordance with Eq. 11.

The differential difference amplifier circuit 610 and/or the $g_m$ amplifier circuit 620 transient feedforward transient block are for amplifying (e.g., isolating and magnifying) the transient voltage change between $V_{FB}$ and $V_{REF}$. The amplified transient signal is high-pass filtered (e.g., by $C_{HPF}$ and $R_{HPF}$) to generate the signal $V_{TFF}$. The signal $V_{TFF}$ is compared with the signal $V_{COM}$ by the loop comparator 220 for generation of the loop comparator output signal (which forms a portion of a feedback control loop including the PWM logic 240 circuit, the ramp loop 230 circuit, and the loop comparator 220 itself).

In a same-gain-stage DDA example, the output of the gain buffer 504 can also be used to drive the high-pass filter formed by the capacitor $C_{HPF}$ and the resistor $R_{HPF}$ of the differential difference amplifier circuit 610. However, loading effects of the high-pass filter can affect the signal $V_{ctrl}$.

In a same-gain-stage $g_m$ amplifier example, an extra branch (e.g., current mirror) can source an output current for coupling to the high-pass filter formed by the capacitor $C_{HPF}$ and the resistor $R_{HPF}$ of the $g_m$ amplifier example 620. The cost of the extra branch is relatively very low.

Figure 7:
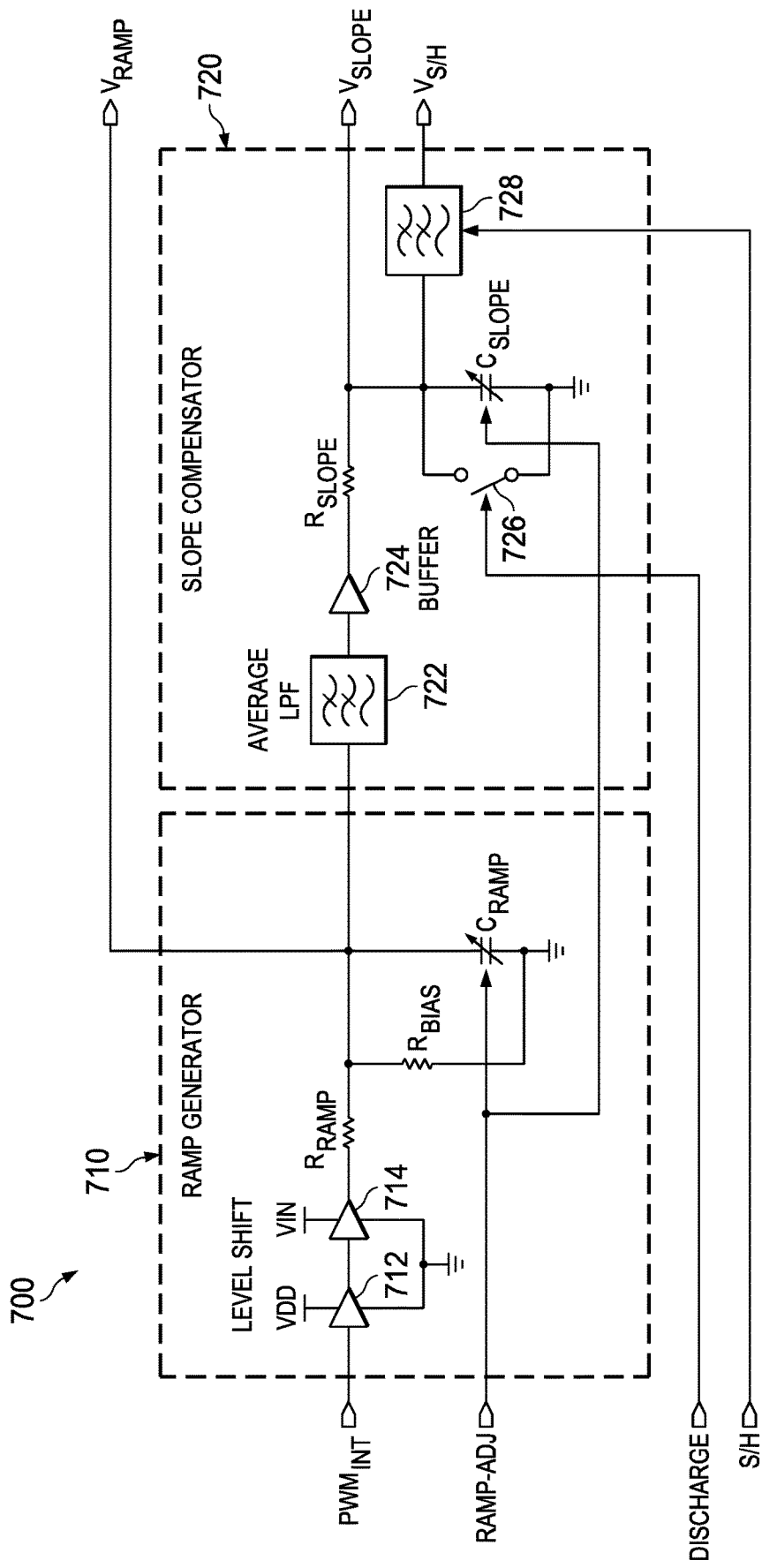
FIG. 7 is a functional diagram of a ramp loop circuit for directly amplified ramp tracking in accordance with this disclosure.

FIG. 7 is a functional diagram of an example ramp loop circuit for directly amplified ramp tracking in accordance with this disclosure. FIG. 7 shows a ramp loop circuit, generally as 700. The ramp loop circuit 700 (which is similar to the ramp loop 230 circuit) includes a ramp generator 710 and a slope compensator 720 circuit.

The ramp generator 710 includes level shifters 712 and 714 and an RC network including resistors $R_{RAMP}$ and $R_{BIAS}$ and programmable capacitor $C_{RAMP}$. The ramp generator 710 is arranged to receive the timing signal $PWM_{INT}$. The timing signal $PWM_{INT}$ is an internal PWM signal characterized by a rising edge occurring around 80 ns before the rising edge of the external PWM signal $PWM_{EXT}$ (which is for controlling the driver 260 for selectively toggling for switching circuit 270). Accordingly, a first PWM signal (e.g., $PWM_{EXT}$) and a second PWM signal (e.g., $PWM_{INT}$) can overlap (e.g., such that at least a portion of the first PWM signal is asserted at the same time as a portion of the second PWM signal).

The high portion of the $PWM_{INT}$ signal is level shifted up to VDD by level shifters 712 and is shifted up to VIN by level shifter 714. The level-shifted $PWM_{INT}$ signal is coupled to drive the RC network. The $V_{RAP}$ signal is generated on the positive plate (e.g., terminal) of $C_{RAMP}$. The slew rate of the $V_{RAMP}$ (and the slew rate of the $V_{SLOPE}$ signal) can be adjusted (e.g., fine-tuned) by changing the capacitance of $C_{RAMP}$ based on the value of the RAMP-ADJ (ramp adjust) signal. The value of the RAMP-ADJ signal can be adjusted via pin-strapping or PMBus (power management bus) commands to optimize transient-response performance.

The slope compensator 720 circuit includes averaging low-pass filter (LPF) 722, buffer 724, an RC network including resistor $R_{SLOPE}$ and programmable capacitor $C_{SLOPE}$, switch 726 for discharging the slope capacitor $C_{SLOPE}$, and averaging LPF 728. The slope compensator 720 circuit generates a sawtooth waveform $V_{SLOPE}$ (signal $V_{SLOPE}$ is discussed below with reference to FIG. 11, for example). The falling edge of $V_{RAMP}$ signal has a slope similar and/or equal to (but opposite in polarity to) the slope of the rising edge of the $V_{SLOPE}$.

The averaging LPF 722 and the buffer 724 generate an average DC voltage (e.g., proportional to the actual $V_{out}$ voltage) in response to the $V_{RAMP}$ signal. The average DC voltage is for driving the RC network (including $R_{SLOPE}$ and $C_{SLOPE}$) of the slope compensator 720, where the slope compensation voltage $V_{SLOPE}$ is generated at the common node of $R_{SLOPE}$ and $C_{SLOPE}$. The slope of the slope compensation voltage $V_{SLOPE}$ is determined in response to the RC- (resistor-capacitor) time constant of the RC network. The signal $V_{SLOPE}$ is coupled to an input of the loop comparator 220 for generation of the loop comparator output signal.

The DISCHARGE signal is a short pulse generated by the PWM logic circuit 240 in response to a clock signal change from a zero to a one (logic state). The DISCHARGE signal closes switch 726 to discharge the slope capacitor $C_{SLOPE}$ (which terminates the rise of the $V_{SLOPE}$ signal and causes the $V_{SLOPE}$ signal to fall to the generated average DC voltage). After the DISCHARGE signal pulse terminates (transitions to the inactive state), the switch 726 is opened such that the slope capacitor $C_{SLOPE}$ begins to charge again based on the average DC voltage (which causes the $V_{SLOPE}$ signal to rise again such that a sawtooth waveform is generated).

The S/H signal is a short pulse generated by the PWM logic circuit 240 in response to a $PWM_{INT}$ signal change from a zero to a one. The S/H signal triggers the average LPF 728 to generate a hold DC voltage in response to the (e.g., instantaneous) value of the slope compensation signal $V_{SLOPE}$ when the $PWM_{INT}$ transitions to an inactive state. The hold DC voltage of $V_{SLOPE}$ is coupled to an input of the loop comparator 220 to lower the effect of the DC offset of the $V_{SLOPE}$ signal.

To help ensure the (e.g., feedback-driven) converter 200 is stable when the duty cycle of $PWM_{INT}$ is higher than 50%, the slope compensation is input to the loop comparator 220 for generation of the loop comparator output signal. The average of signal $V_{RAMP}$ can be expressed as:

$$V_{RAMP-AVE} \approx V_{out} \cdot \frac{R_{BIAS}}{R_{RAMP} + R_{BIAS}} \quad (13)$$

where $R_{BIAS}$ and $R_{RAMP}$ are resistors of the RC network of the ramp generator 710.

The discharging current through $R_{RAMP}$ and $R_{BIAS}$ can be expressed as:

$$Ioffdischrg = \frac{Vout}{R_{RAMP}} \quad (14)$$

The falling slope m2 can be expressed as:

$$m2 = \frac{Ioffdischrg}{C_{RAMP}} = \frac{Vout}{R_{RAMP} \cdot C_{RAMP}} \quad (15)$$

To help ensure loop stability when duty cycle of $PWM_{INT}$ is higher than 50%, the rising slope m can be expressed as:

$$m \geq \frac{1}{2}m2 = \frac{V_{out}}{2 \cdot R_{RAMP} \cdot C_{RAMP}} \quad (16)$$

$V_{out}$, $R_{RAMP}$ and $C_{RAMP}$ can be predetermined values, such that the slope compensation can be inherently optimized (e.g., before deployment of the system 100). The inherently optimized slope compensation of the DART converter can be more efficient than some peak current mode control methods.

For peak current mode control, the slope compensation can be fixed with respect to worst-case conditions that could occur due to a selection of a particular inductor after deployment. As a result, relatively large margins for slope compensation are provided, such that system response to load transients is degraded from optimum response times.

In contrast, the slew rate of the falling slope of the $V_{RAMP}$ can be predetermined. Accordingly, the directly amplified ramp tracking-controlled converter slope compensation design can be optimized without providing relatively wide design margins, which would otherwise affect the system transient response.

Figure 8:
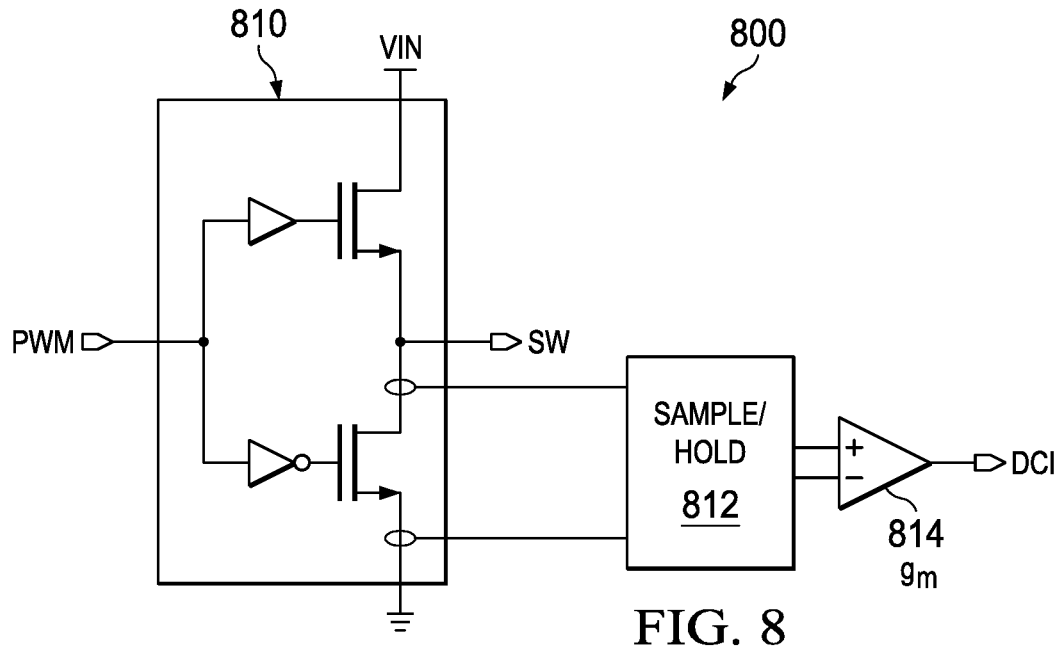
FIG. 8 is a schematic diagram of a switching circuit sample-and-hold current information generator for directly amplified ramp tracking in accordance with this disclosure.

FIG. 8 is a schematic diagram of an example switching circuit sample-and-hold signal generator for directly amplified ramp tracking in accordance with this disclosure. In FIG. 8, an example switching circuit sample-and-hold signal generator 800 is generally described as including a switching circuit 810 (which is similar to the switching circuit 270), a sample/hold 812 circuit (which is similar to the sample/hold 280 circuit), and a DC-current feedback indicator generator 814 (which is similar to the DC-current feedback indicator generator 290 circuit).

To decrease the Q value (e.g. quality factor) at the double pole frequency (where a Q value of 1 or lower increases loop stability), a small DC current feedback is added to the feedback loop driven by the loop comparator 220. The current information is sensed from a power stage of a Buck-converter (e.g., from a voltage developed across the low-side FET of the switching circuit 810). The voltage developed across the low-side FET is proportional to current (e.g., flowing through the external inductor when the low-side FET is on).

This voltage developed across the low-side FET is sampled and held by the sample/hold 812 circuit after a noise-blanking time. The DC-current feedback indicator generator 814 is a transimpedance amplifier for converting the current information from the sampled and held (S/H) voltage to a current proportional to the current drawn through the lower FET of the switching circuit 810. The output of the DC-current (DCI) feedback indicator generator 814 (e.g., signal DCI) is coupled as feedback current to the loop comparator 220.

Because the $V_{RAMP}$ emulates the AC portion of the inductor current change, complex impedances exist. For example, a double pole peak exists based on the LC-based transfer function in accordance with a Bode plot analysis of DART. The complex impedances result in frequency dependence of the feedback signal in both amplitude and phase. Accordingly, the phase angle decreases around the double pole. When the transimpedance bandwidth is around the double pole frequency, the phase margin is often decreased. To maintain an adequate phase margin, a relatively small amount of DC current information is added via signal DCI as input to the loop comparator 220. The signal DCI is processed by the loop comparator 220 to adjust the $V_{ctrl}$ level. Accordingly, adding the DCI signal feedback improves the phase margin at the double pole frequency and can achieve a wider stability range by DART (e.g., when the DART circuitry is coupled to an inductor having an inductance chosen by a user of a deployed DART circuit).

Figure 9:
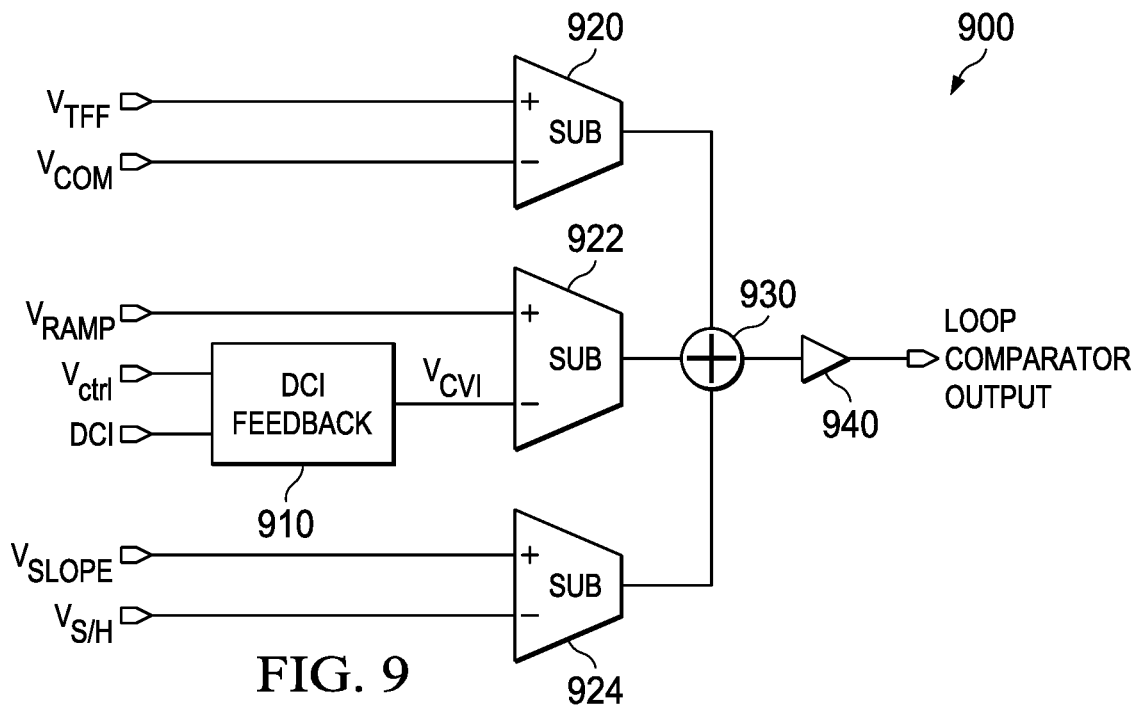
FIG. 9 is a schematic diagram of a loop comparator for directly amplified ramp tracking in accordance with this disclosure.

FIG. 9 is a schematic diagram of an example loop comparator for directly amplified ramp tracking in accordance with this disclosure, generally as 900. In FIG. 9, the example loop comparator 900 (which can be similar to loop comparator 220) is generally described as including DCI feedback 910 circuit, subtractors (SUB) 920, 922, and 924, adder 930, and output buffer 940.

The loop comparator 900 is arranged for comparing the input signals $V_{TFF}$ (transient feedforward voltage), $V_{COM}$ (common reference voltage), $V_{RAMP}$, $V_{ctrl}$, DCI (load current feedback information), $V_{SLOPE}$, and $V_{S/H}$ (a portion of the slope compensation signal $V_{SLOPE}$ sampled in response to the falling edge of the $PWM_{INT}$ signal). The falling edges of each of the $PWM_{INT}$ and the $PWM_{EXT}$ signals are initiated in response to the feedback control signal output by the loop comparator 220. Accordingly, the loop comparator 220 terminates the PWM pulse (e.g., for driving the external coil) based on the comparison of the input signals in a feedback loop-based configuration.

For example, the subtractor 920 is arranged to subtract the $V_{TFF}$ signal from the $V_{COM}$ and to provide the (e.g., analog) result of the comparison to a first input of the adder 930. The DCI feedback circuit 910 is arranged to subtract the DCI signal from the $V_{ctrl}$ signal to generate the $V_{CVI}$ (control voltage-current) signal. The subtractor 922 is arranged to subtract the $V_{CVI}$ signal from the $V_{RAMP}$ and to provide the (e.g., analog) result of the comparison to a second input of the adder 930. The subtractor 924 is arranged to subtract the $V_{S/H}$ signal from the $V_{SLOPE}$ and to provide the (e.g., analog) result of the comparison to a third input of the adder 930 The adder 930 is arranged to add the first, second, and third inputs to generate a combined output signal, which is buffered by the buffer 940 to generate the loop comparator output.

Accordingly, the sum of the positive inputs: $Vpos=V_{TFF}+V_{RAMP}+V_{SLOPE}$ is compared to the sum of the negative inputs: $Vneg=V_{CVI}+V_{COM}+V_{S/H}$. When $V_{pos}$ becomes larger than the $V_{neg}$, the output of the loop comparator transitions high, which terminates the assertion of $PWM_{INT}$ and $PWM_{EXT}$ (e.g., forces the $PWM_{INT}$ and $PWM_{EXT}$ signals low).

The load current feedback information DCI can also be combined with any one of the six other inputs of loop comparator. For example, the signal DCI can be combined with either the $V_{COM}$ and $V_{ctrl}$ signals because their rates of change are relative slow and the source impedance is low. Accordingly, the voltage difference between $V_{CVI}$ and $V_{ctrl}$ changes proportionally to the load current in response to the load current feedback information DCI.

Figure 10:
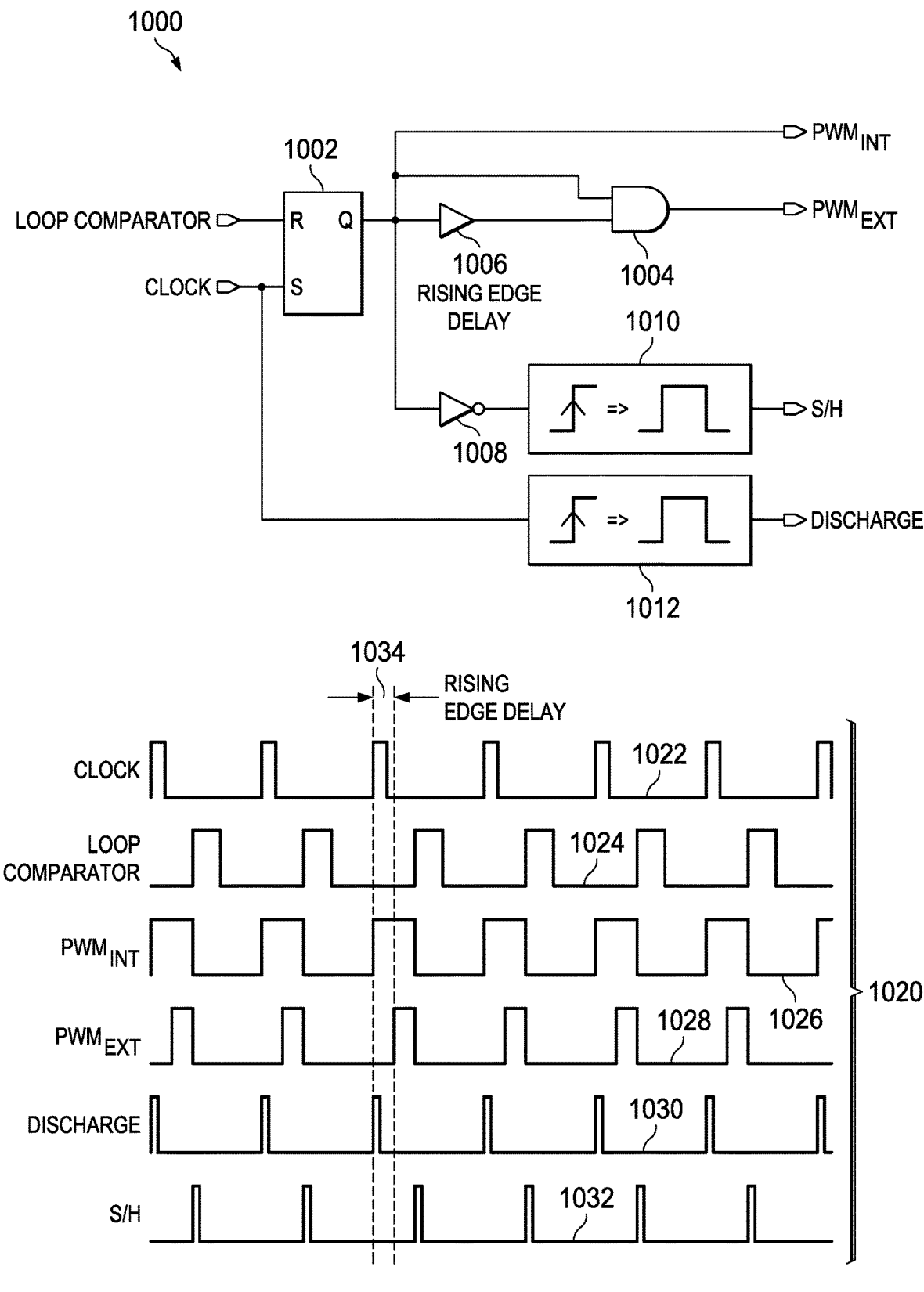
FIG. 10 is a schematic diagram of a pulse width modulation logic circuit for directly amplified ramp tracking in accordance with this disclosure.

FIG. 10 is a schematic diagram of an example pulse width modulation logic circuit for directly amplified ramp tracking in accordance with this disclosure, generally as 1000. In FIG. 10, the example PWM logic 1000 circuit (which can be similar to PWM logic 240 circuit) includes latch 1002, AND gate 1004, rising edge delay buffer 1006, inverter 1008, S/H pulse generator 1010, and a discharge pulse generator 1012. In general, the PWM logic 1000 circuit is arrange to receive the loop comparator output and a system clock signal for generating the $PWM_{INT}$ signal (for driving the ramp generator 232), the PWM$_{EXT}$ signal (for driving the driver 260), and the S/H and the discharge signals (for driving the slope compensation circuit 234).

The clock signal 1022 (as shown in waveforms 1020) synchronizes circuitry of the DART converter 200 for controlling DART in each PWM cycle. For example, the discharge signal 1030 pulse is generated every clock cycle by triggering the discharge pulse generator 1012 in response to the rising edge of the clock signal 1022.

The latch 1002 asserts the PWM$_{INT}$ signal 1026 in response to the rising edge of the clock signal 1022. The latch 1002 de-asserts the PWM$_{INT}$ signal 1026 in response to the rising edge of the loop comparator signal 1024. The PWM$_{INT}$ signal 1026 controls the timing of the V$_{RAMP}$ signal. For example, the V$_{RAMP}$ signal rises when the PWM$_{INT}$ signal 1026 is high, and the V$_{RAMP}$ signal falls when the PWM$_{INT}$ signal 1026 is low (e.g., see waveforms 1114 and 1108 of FIG. 11).

The PWM$_{EXT}$ signal 1028 is generated in delayed response to the PWM$_{INT}$ signal 1026. For example, the PWM$_{INT}$ signal 1026 is coupled to the rising edge delay buffer 1006. The rising edge delay buffer 1006 is arranged to delay the rising edge of an input signal by, for example, 80 ns. The output of the rising edge delay buffer 1006 is logically ANDed with the PWM$_{INT}$ signal 1026 to generate the PWM$_{EXT}$ signal 1028. Accordingly, the PWM$_{EXT}$ signal 1028 is driven high after a fixed rising edge delay time 1034 (e.g., of about 80 ns) after the rising edge of the PWM$_{INT}$ signal 1028 rising edge. Moreover, the PWM$_{EXT}$ signal 1028 is driven low concurrently with the falling edge of the PWM$_{INT}$ signal 1026. The PWM$_{EXT}$ signal 1028 is coupled to the driver 260 for driving the switch node voltage of switching circuit 270. When the switch node voltage of switching circuit 270 is driven high, the node of the signal V$_{SW}$ node is driven high.

The S/H signal 1032 is generated in response to the PWM$_{INT}$ signal 1026. For example, the S/H signal 1032 is coupled to the inverter 1008, which in turn is coupled to the S/H pulse generator 1010. The generated S/H signal 1032 includes a narrow pulse (about 10 ns wide), which is triggered by the falling edge of the PWM$_{INT}$ signal 1026. The S/H signal 1032 initiates the sampling of the slope compensation sawtooth voltage (e.g., by closing switch 726) in response to the falling edge of the PWM$_{INT}$ signal 1026. The sampled-and-held voltage is coupled to a loop comparator 220 input for reducing the DC offset of the V$_{SLOPE}$ signal.

Figure 11:
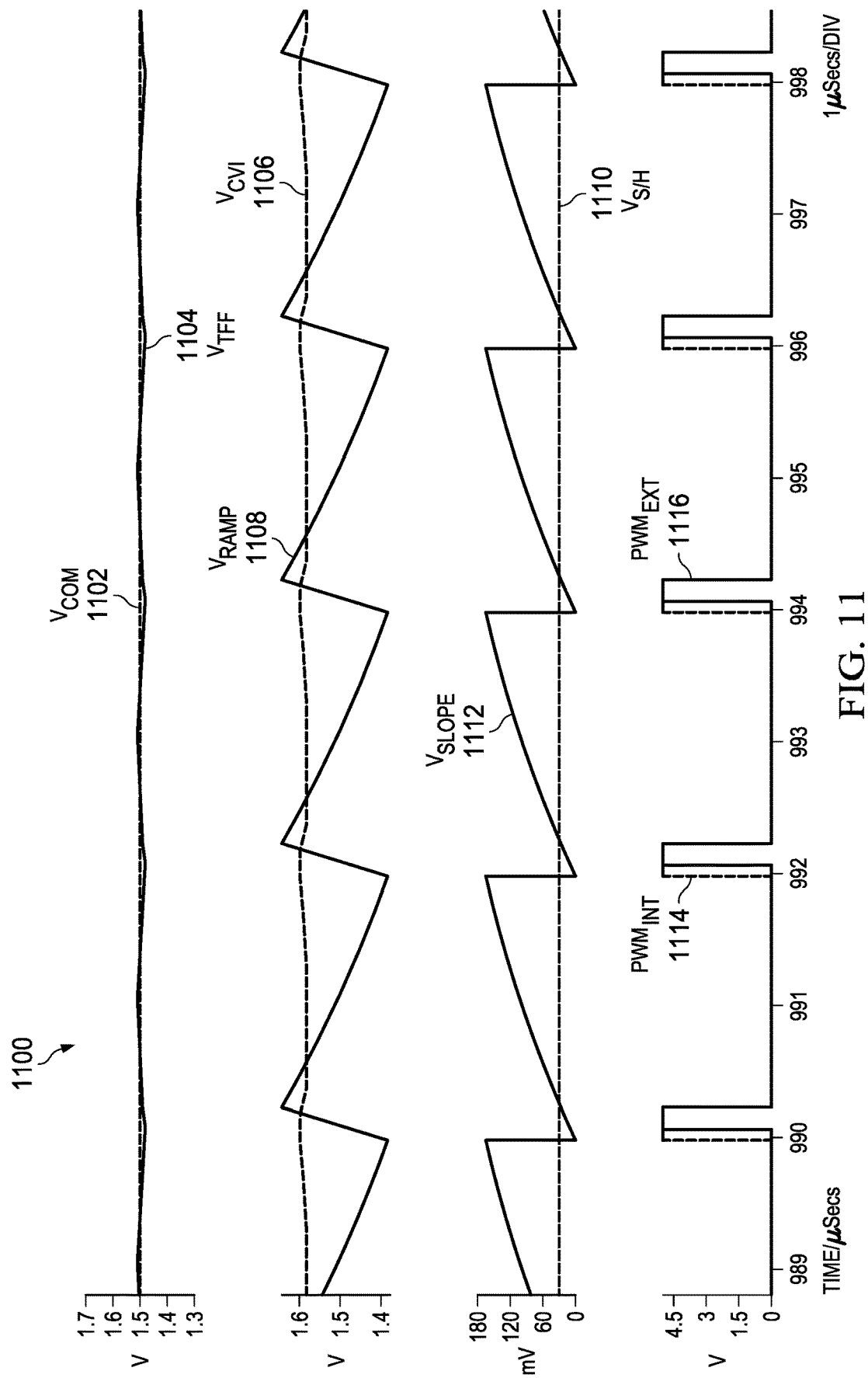
FIG. 11 is a waveform diagram of selected waveforms in steady state operation of a directly amplified ramp tracking converter in accordance with this disclosure.

FIG. 11 is an example waveform diagram of selected waveforms in steady state operation of a directly amplified ramp tracking converter in accordance with this disclosure, generally as 1100. In FIG. 11, waveforms 1100 include the waveforms V$_{COM}$ 1102, V$_{TFF}$ 1104, V$_{CVI}$ 1106, V$_{RAMP}$ 1108, V$_{S/H}$ 1110, V$_{SLOPE}$ 1112, PWM$_{INT}$ 1114, and PWM$_{EXT}$ 1116. The waveforms 1100 show, for example, a DART converter 200 operating in a steady state.

A first pair of signals V$_{COM}$ 1102 and V$_{TFF}$ 1104 are combined (e.g., by subtracting V$_{COM}$ 1102 from V$_{TFF}$ 1104) to remove DC components of V$_{TFF}$ 1104 such that the response to load transients of loop comparator 220 is enhanced. The signal V$_{COM}$ 1102 is a constant signal generated (e.g., by a voltage divider) as being the average of the analog high power rail and the analog low power rail, which maximizes the dynamic range of signals compared with V$_{COM}$ 1102. V$_{TFF}$ 1104 is the amplified AC-components of signal V$_{FB}$ (e.g., which is generated by the voltage divider formed by the series of R$_{s1}$ and R$_{s2}$ in response to the generated output voltage V$_{out}$ of FIG. 1).

During steady-state operation of the DART converter (e.g., 110 and/or 200), the transient change is zero and the value of the signal V$_{TFF}$ 1104 is about equal to the value of the V$_{COM}$ 1102 signal. As indicated by the illustrated waveform, V$_{TFF}$ 1104 includes a relatively small amount of V$_{out}$ ripple. The average voltage level of V$_{TFF}$ 1104 is equal to the value of V$_{COM}$ 1102, which minimizes offsets from other system signals normalized with respect to V$_{COM}$.

A second pair of signals V$_{CVI}$ 1106 and V$_{RAMP}$ 1108 are combined (e.g., where V$_{CVI}$ 1106 is subtracted from V$_{RAMP}$ 1108) for enhancing stability of the feedback loop. During steady state operation, the average voltage of V$_{RAMP}$ 1108 is about the same as the voltage of V$_{COM}$ 1102. The waveform of V$_{RAMP}$ 1108 ramps higher when PWM$_{INT}$ 1114 is high. The slope of V$_{RAMP}$ 1108 is determined in response to VIN and the resistor R$_{RAMP}$ and capacitor C$_{RAMP}$ of the ramp generator 710. When V$_{RAMP}$ 1108 amplitude reaches the level of the V$_{CVI}$ signal 1106, the PWM$_{INT}$ 1114 transitions low in response (e.g., after the propagation delay of the loop comparator 220). After the PWM$_{INT}$ 1114 signal transitions low, the V$_{RAMP}$ signal 1108 ramps lower until the PWM$_{INT}$ 1114 signal is asserted again during the next clock signal.

The V$_{CVI}$ signal 1106 is generated in response to the DC current feedback signal DCI (e.g., which is generated by the DC-current feedback indicator generator 290) and in response to the V$_{ctrl}$ signal (e.g., which is generated by the gain and level shifter 214). When the load current is increased, the increase of the signal DCI causes the level of the signal V$_{CVI}$ 1106 to decrease (e.g., moving downwards from the level of the V$_{ctrl}$ signal). In response to the decrease in V$_{CVI}$ 1106, the DART feedback loop forces the V$_{ctrl}$ signal higher (e.g., such that the V$_{ctrl}$ signal is forced higher in response to the increase of the load current). Accordingly, the signal V$_{CVI}$ 1106 intersects the peak of V$_{RAMP}$ 1108, and the level of the V$_{ctrl}$ signal varies in response to changes in the load current. When there is no load current, the voltage of the signal V$_{CVI}$ 1106 is about the same as the voltage of the V$_{ctrl}$ signal.

A third pair of signals V$_{S/H}$ 1110 and V$_{SLOPE}$ 1112 are combined (e.g., where V$_{S/H}$ 1110 is subtracted from V$_{SLOPE}$ 1112 by loop comparator 220) for providing slope compensation. The slope compensation sawtooth waveform V$_{SLOPE}$ 1112 adds slope compensation to the feedback control loop. The V$_{S/H}$ 1110 signal is generated by sampling and holding the value of the V$_{SLOPE}$ 1112 in response to each PWM$_{INT}$ falling edge. Subtracting the sampled voltage V$_{S/H}$ 1110 from the (e.g., instantaneous) values of the V$_{SLOPE}$ 1112 reduces the DC offset of the feedback control loop before integration (which increases the dynamic range of the feedback control loop).

As discussed above, the PWM$_{EXT}$ 1116 signal controls the switching circuit (e.g., 270) for switching an external inductor. The PWM$_{INT}$ 1114 signal (for controlling the internal feedback control loop) is about 80 ns wider than (and initiated about 80 ns before) the PWM$_{EXT}$ 1116 signal. The 80 ns delay time provides time for the loop comparator 220 circuits to respond to the feedback control loop (e.g., before the external inductor is switched).

Figure 12:
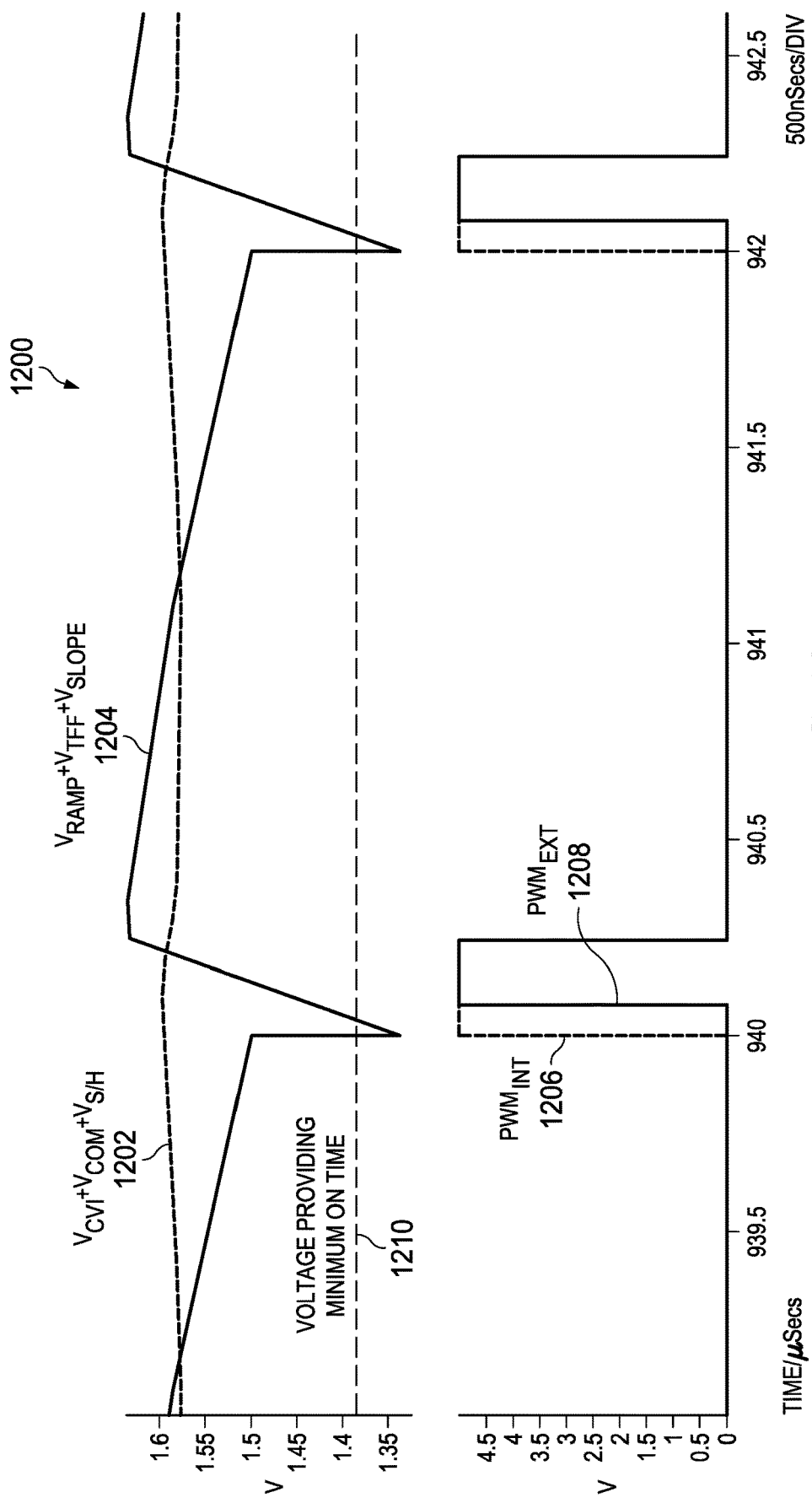
FIG. 12 is a waveform diagram of combined waveforms of a directly amplified ramp tracking converter in accordance with this disclosure.

FIG. 12 is an example waveform diagram of combined waveforms of a directly amplified ramp tracking converter in accordance with this disclosure, generally as 1200. In FIG. 12, waveforms 1200 include the combined positive-input waveform (V$_{pos}$) 1204 and the combined negative-input waveform (V$_{neg}$) 1202. For example, the positive-input waveform 1204 can be expressed as the positive sum:

$$V_{pos} = V_{TFF} + V_{RAMP} + V_{SLOPE} \qquad (17)$$

and the negative-input waveform 1202 can be expressed as the negative sum:

$$V_{neg}=V_{CVI}+V_{COM}+V_{S/H} \quad (18)$$

When the signal $V_{pos}$ 1204 is higher than $V_{neg}$ 1202, the loop comparator 220 transitions high (e.g., after the latency of the loop comparator 220). Both the signals $PWM_{INT}$ 1206 and $PWM_{EXT}$ 1208 are forced low (e.g., in response to the output of the loop comparator 220 transitioning to a high state), which terminates the "on-time" portion of the PWM cycle in which "on-time" portion the external inductor is being energized.

The assertion of the discharge pulse (e.g., see 1012) at the beginning of the assertion of the signal $PWM_{INT}$ 1206 forces the $V_{pos}$ 1204 signal downwards below a minimum $V_{neg}$ voltage 1210. After the end of the discharge pulse, the VRAMP and VSLOPE signals increase, which causes the $V_{pos}$ 1204 signal to rise above the minimum voltage 1210. When the $V_{pos}$ 1204 signal reaches the $V_{neg}$ 1202 signal, the loop comparator 220 is triggered for ending the assertions of the $PWM_{INT}$ signal 1206 and the $PWM_{EXT}$ signal 1208.

The rise time of the $V_{pos}$ 1204 signal to rise from the minimum voltage 1210 to reach the $V_{neg}$ 1202 signal determines the minimum on time of the $PWM_{EXT}$ signal 1208. By inspection of the scaling of voltages and time, it is evident that even when the width of the $PWM_{EXT}$ signal 1208 is relatively close to zero (e.g., 10 nanoseconds), there is sufficient $PWM_{INT}$ signal 1206 width and headroom of the $V_{RAMP}$ amplitude to provide sufficient margins for control. Accordingly, DART techniques are well suited for very high switching frequency operation (e.g., as compared to lower frequency limitations of some peak current mode controls).

Figure 13:
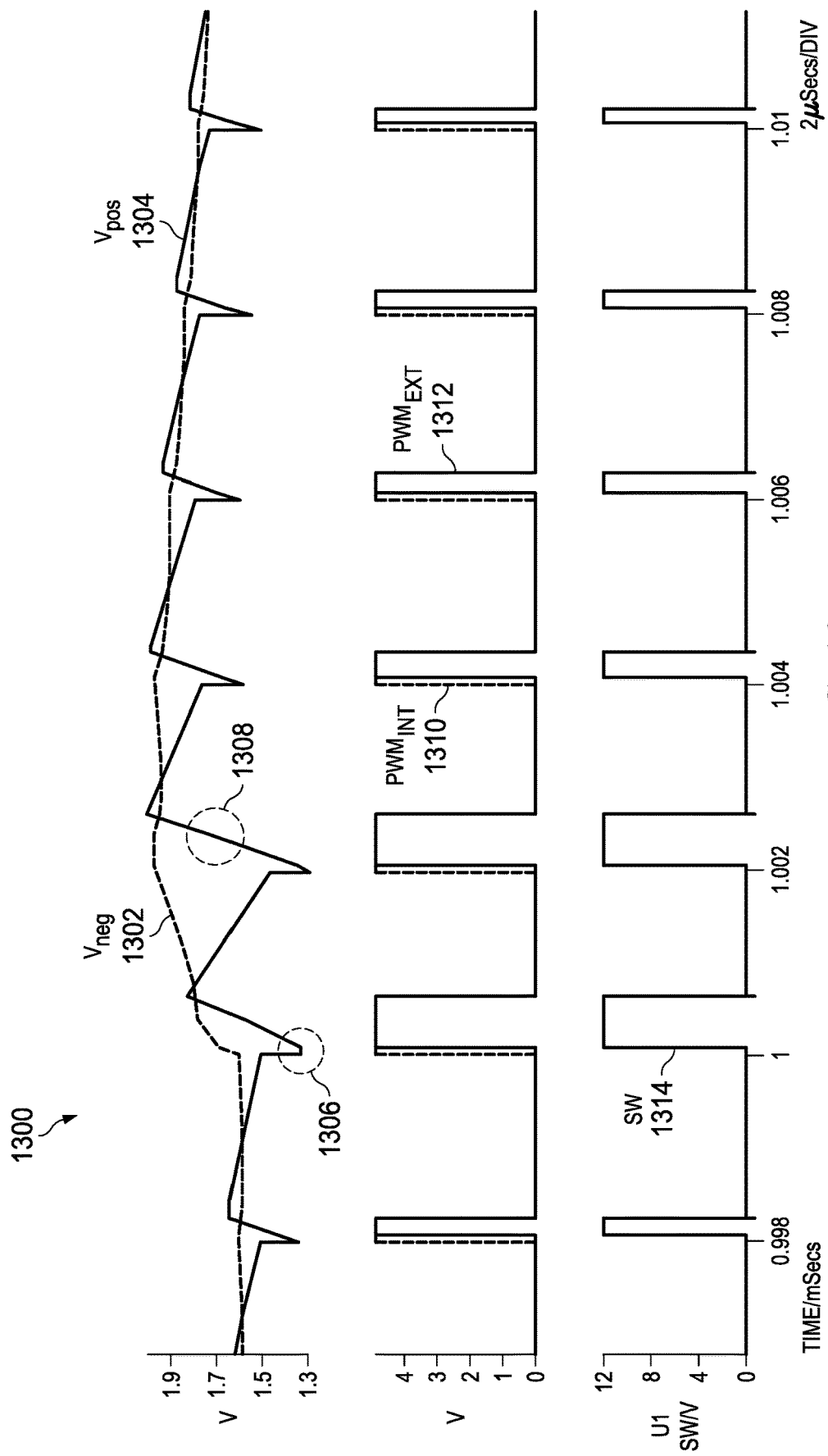
FIG. 13 is a waveform diagram of combined waveforms in response to an increased load of a directly amplified ramp tracking converter in accordance with this disclosure.

FIG. 13 is an example waveform diagram of combined waveforms in response to an increased load of a directly amplified ramp tracking converter in accordance with this disclosure, generally as 1300. In FIG. 13, waveforms 1300 include the $V_{neg}$ 1302 signal, the $V_{pos}$ 1304 signal, the $PWM_{INT}$ signal 1310, $PWM_{EXT}$ signal 1312, and the SW 1314 signal. Generally, FIG. 13 shows an example system response to an increased load.

During a load step-up transient, the output voltage $V_{out}$ falls based on the increase in current drawn by an increased load. In response to the lowered output voltage $V_{out}$, the $V_{neg}$ 1302 signal (the sum of the negative inputs of the loop comparator 220) increases and slope of the $V_{pos}$ 1304 signal (the sum of the positive inputs of the loop comparator 220) decreases. The on-percentage of duty cycle is increased to raise the output voltage $V_{out}$ towards a target voltage.

In an example scenario, a load step-up transient occurs around the 1 ms mark. Without delay buffer-induced delay (and/or clock synchronization gating), the DART control loop quickly initiates a response to the load step-up transient. For example, the $V_{neg}$ 1302 signal rises upwards and beyond recent voltages, while the $V_{TFF}$ voltage component of the $V_{pos}$ 1304 signal lowers the valley point 1306 and changes the slope of the $V_{pos}$ 1304 signal. Accordingly, the ON-percentage of duty cycle is increased response to the load step-up transient.

Because the $V_{neg}$ 1302 signal continues to increase in the next PWM cycle, the $V_{TFF}$ voltage component of the $V_{pos}$ 1304 signal induces another lowered valley point of the $V_{pos}$ 1304 signal, and the succeeding duty cycle is elongated for increasing the output voltage $V_{out}$. Accordingly, the ON-percentage of a duty cycle is increased response to a load step-up transient. The switching signal SW 1314 is similar to the timing (and the ON-percentage) as the $PWM_{EXT}$ 1312 (e.g., as modified by the switching circuit driver propagation latency).

Figure 14:
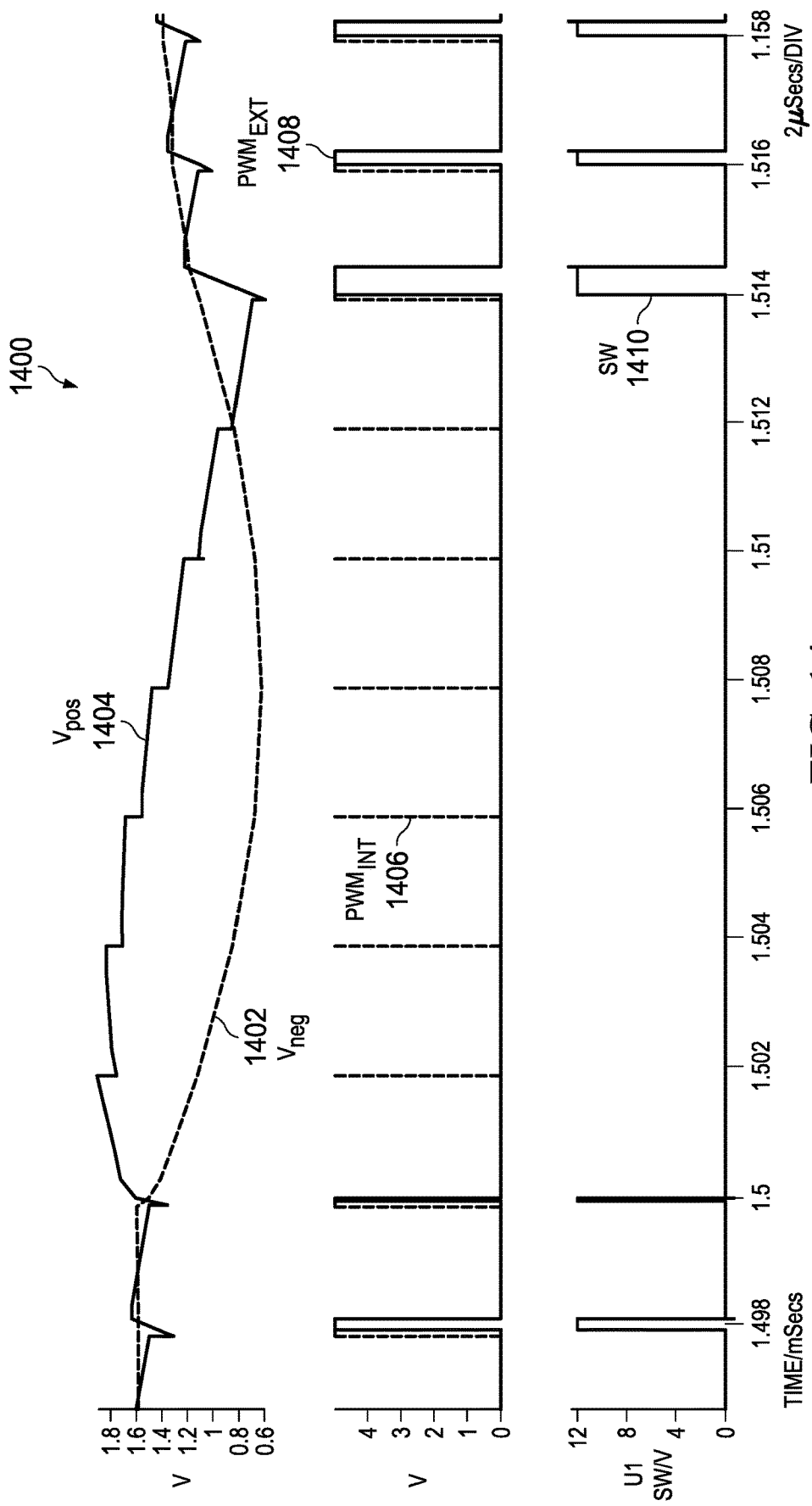
FIG. 14 is a waveform diagram of combined waveforms in response to a decreased load of a directly amplified ramp tracking converter in accordance with this disclosure.

FIG. 14 is an example waveform diagram of combined waveforms in response to a decreased load of a directly amplified ramp tracking converter in accordance with this disclosure, generally as 1400. In FIG. 14, waveforms 1400 include the $V_{neg}$ 1402 signal, the $V_{pos}$ 1404 signal, the $PWM_{INT}$ signal 1406, $PWM_{EXT}$ signal 1408, and the SW 1410 signal. Generally, FIG. 14 shows an example system response to a decreased load.

During a load step-down transient, the output voltage $V_{out}$ rises based on a decrease in the current drawn by a decreased load. In response to the raised output voltage $V_{out}$, the $V_{neg}$ 1402 signal (the sum of the negative inputs of the loop comparator 220) decreases and slope of the $V_{pos}$ 1404 signal (the sum of the positive inputs of the loop comparator 220) initially increases. The ON-percentage of duty cycle is decreased (even to zero percent) to help the output voltage $V_{out}$ fall towards a target voltage.

In an example scenario, a load step-down transient occurs around the 1.5 ms mark and the output voltage $V_{out}$ rises. Without delay buffer-induced delay (and/or clock synchronization gating), the DART control loop responds to the output voltage $V_{out}$ rise. For example, the $V_{neg}$ 1402 signal falls, while the $V_{TFF}$ voltage component of the $V_{pos}$ 1404 signal rises upwards in accordance with a change to the slope of the $V_{pos}$ 1404 signal. Because the magnitude of the load step-down transient is relatively large, the $V_{TFF}$ component of the $V_{pos}$ 1404 signal is relatively large and a portion of the $V_{pos}$ 1404 signal (e.g., which usually tends downwards) is changed to a positive slope. Accordingly, the ON-percentage of duty cycle is reduced in response to the load step-down transient and the output voltage $V_{out}$ is lowered towards a target voltage.

When the load transient release is sufficiently large, the $PWM_{EXT}$ signal 1408 and SW signal 1410 can be omitted so as to provide an optimal response to the load step-down transient. In such cases where the $PWM_{EXT}$ 1408 signal is not asserted (e.g., because the asserted $PWM_{EXT}$ 1408 signal would not otherwise meet a minimum $PWM_{EXT}$ width requirement), the internal $PWM_{INT}$ 1406 signal is still periodically asserted such that the DART control loop is maintained over the successive periods in which the output voltage $V_{out}$ is being lowered towards the target voltage.

Figure 15:
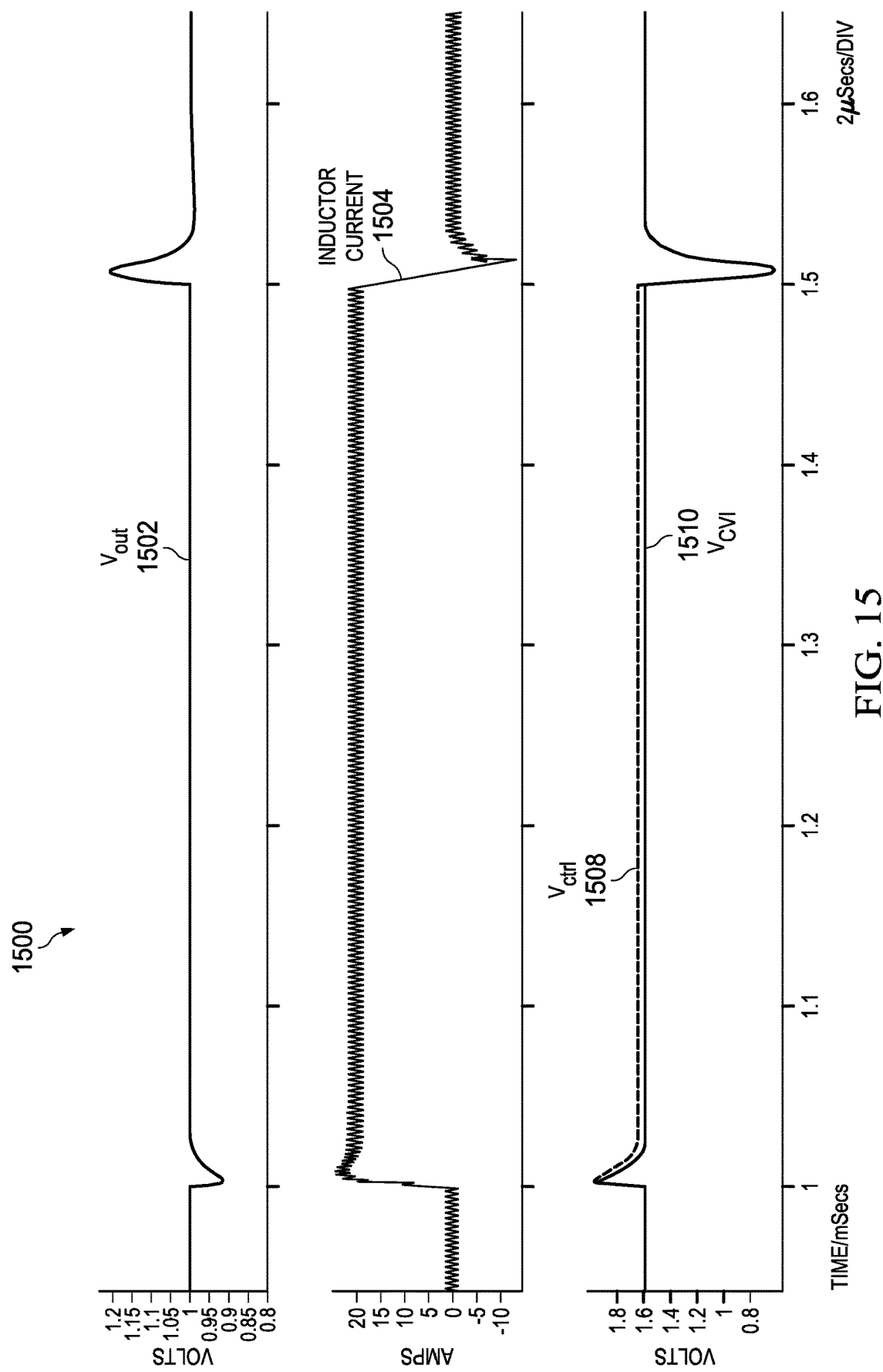
FIG. 15 is a waveform diagram of waveform response to an increased load followed by a decreased load of a directly amplified ramp tracking converter in accordance with this disclosure.

FIG. 15 is an example waveform diagram of waveform response to an increased load followed by a decreased load of a directly amplified ramp tracking converter in accordance with this disclosure, generally as 1500. In FIG. 15, waveforms 1500 include the $V_{out}$ 1502 signal, the inductor current 1504, the $V_{ctrl}$ signal 1508, and the $V_{CVI}$ signal 1510. Generally, FIG. 15 shows an example system response to an increased load and to a decreased load.

When the load current increases, for example, the $V_{out}$ 1502 signal falls until such time the inductor current 1504 rises to a level sufficient to restore the $V_{out}$ 1502 signal to the targeted (e.g., regulated) voltage. In response to the drop in the $V_{out}$ 1502 signal, the $V_{ctrl}$ signal 1508 and the $V_{CVI}$ signal 1510 rise such that the PWM ON-percentage increases (which increases the inductor current 1504). When the load current changes from 0 A to 20 A, the inductor current 1504 changes by the same amounts of current. The DC current feedback (DCI) raises the level of the $V_{ctrl}$ signal 1508 above the $V_{CVI}$ signal 1510 by about 60 mV for the 20 A load current increase.

When the load current decreases, for example, the $V_{out}$ 1502 signal rises until such time the PWM ON-percentage decreases inductor current 1504 to a level sufficient for the $V_{out}$ 1502 signal to fall to the targeted (e.g., regulated) voltage. When the $V_{out}$ 1502 signal rises above the targeted voltage, the $V_{ctrl}$ signal 1508 and the $V_{CVI}$ signal 1510 fall such that the PWM ON-percentage decreases (which decreases the inductor current 1504). When the $V_{out}$ 1502 signal falls below the targeted voltage, the $V_{ctrl}$ signal 1508 and the $V_{CVI}$ signal 1510 rise such that the PWM ON-percentage increases (which increases the inductor current 1504) and the $V_{out}$ 1502 signal rises such that the $V_{out}$ 1502 signal is regulated around the targeted voltage.

When load current changes, the DCI signal (e.g., which is used to form a DC current feedback loop) changes the voltage level of the $V_{ctrl}$ signal 1508. The DCI signal decreases the Q value of the power stage double pole and increases the phase margin associated with relatively large output capacitors (e.g., capacitor $C_{out}$ of the Buck converter system 100).

At the 1 ms mark, the control voltages $V_{ctrl}$ 1508 and $V_{CVI}$ 1510 rise rapidly to quickly respond to a load step-up transient. After the load step-up transient event, the control voltage $V_{CVI}$ returns the same level as the low load current condition whereas the $V_{ctrl}$ signal 1508 returns to a level about 60 mV above the low load current condition level of the $V_{ctrl}$ signal 1508. The integrator 216 is arranged to accommodate voltage swings of at least 60 mV system offset efficiently. Accordingly, converters arranged in accordance with the DART description are suited for high frequency operation at high load currents (e.g., operation above around 4 MHz at currents of greater than around 40 amps).

In contrast, the control voltage for peak current mode controls can change about 400 mV in response to similar load currents. The relatively large voltage swing of the control voltage presents a greater challenge for optimizing internal compensation during peak current mode.

Although the invention has been described in detail, it should be understood that various changes, substitutions and alterations can be made thereto without departing from the spirit and scope of the invention as defined by the appended claims.

What is claimed is:

1. A circuit, comprising:
   a pulse width modulation (PWM) logic circuit configured to generate a first PWM signal associated with a power switch, the first PWM signal having a first pulse, and a second PWM signal having a second pulse corresponding to and partially overlapping in time with the first pulse, the second pulse having an earlier rising edge and a longer duty cycle than the first pulse of the first PWM signal;
   a loop circuit coupled to the PWM logic circuit, and configured to generate a ramp signal based on the second PWM signal; and
   a comparator circuit coupled to the loop circuit, and configured to generate a feedback control signal based on the ramp signal, the feedback control signal received by the PWM logic circuit to control a pulse width of the first PWM signal.

2. The circuit of claim 1, wherein the PWM logic circuit includes:
   a set-reset (SR) latch having a reset input coupled to receive the feedback control signal, a set input coupled to receive a clock signal from an oscillator, and a latch output;
   a delay element having an input coupled to the latch output, and a delay output;
   an AND gate having a first input coupled to the delay output of the delay element, a second input coupled to the latch output, and an AND output;
   a first PWM output coupled to the AND output, and configured to output the first PWM signal; and
   a second PWM output coupled to the latch output, and configured to output the second PWM signal.

3. The circuit of claim 2, wherein the delay element includes a rising edge delay buffer.

4. The circuit of claim 1, wherein:
   the first PWM signal has a first rising edge; and
   the second PWM signal has a second rising edge leading the first rising edge by a time period approximating a response time of the comparator circuit.

5. The circuit of claim 1, wherein:
   the first PWM signal has a first duty cycle; and
   the second PWM signal has a second duty cycle greater than the first duty cycle by a time period approximating a response time of the comparator circuit.

6. The circuit of claim 1, wherein:
   the first PWM signal has a first rising edge; and
   the second PWM signal has a second rising edge leading the first rising edge by 80 ns.

7. The circuit of claim 1, wherein:
   the first PWM signal has a first duty cycle; and
   the second PWM signal has a second duty cycle greater than the first duty cycle by 80 ns.

8. The circuit of claim 1, wherein:
   the first PWM signal has a first falling edge; and
   the second PWM signal has a second falling edge synchronous with the first falling edge.

9. The circuit of claim 1, wherein the first PWM signal is configured to regulate the power switch.

10. The circuit of claim 1, wherein the first PWM signal is configured to regulate a power transfer from a input voltage source to an output inductor.

11. A circuit, comprising:
    a pulse width modulation (PWM) logic circuit having:
       a loop comparator input terminal;
       a latch coupled to the loop comparator input terminal;
       a first PWM output terminal;
       a delay element coupled between the latch and the first PWM output terminal; and
       a second PWM output terminal coupled to the latch;
    a loop circuit having a loop input coupled to the second PWM output terminal, and a loop output; and
    a comparator circuit having a comparator input coupled to the loop output, and a comparator output coupled to the loop comparator input terminal of the PWM logic circuit.

12. The circuit of claim 11, wherein:
    the latch includes a set-reset (SR) latch having a reset input coupled to the loop comparator input terminal, a set input coupled to receive a clock signal from an oscillator, and a latch output;
    the PWM logic circuit includes an AND gate having a first input coupled to a delay output of the delay element, a second input coupled to the latch output, and an AND output;
    the first PWM output terminal is coupled to the AND output; and
    the second PWM output terminal coupled to the latch output.

13. The circuit of claim 11, wherein the delay element includes a rising edge delay buffer.

14. The circuit of claim 11, wherein the delay element includes delay time constant approximating a response time of the comparator circuit.

15. The circuit of claim 11, wherein the delay element includes delay time constant of about 80 ns.

16. The circuit of claim 11, wherein the first PWM output terminal is coupled to an output driver configured to regulate a power switch.

17. The circuit of claim 11, wherein the first PWM output terminal is coupled to an output driver configured to regulate a power transfer from a input voltage source to an output inductor.

18. A circuit, comprising:
a pulse width modulation (PWM) logic circuit configured to generate a first PWM signal associated with a power switch, and a second PWM signal having an earlier rising edge than the first PWM signal;
a ramp circuit coupled to the PWM logic circuit, and configured to generate a ramp signal based on the second PWM signal;
a slope compensation circuit coupled to the PWM logic circuit, and configured to generate a slope signal based on the second PWM signal; and
a comparator circuit coupled to the ramp circuit and the slope compensation circuit, and configured to generate a feedback control signal based on the ramp signal and the slope signal, the feedback control signal received by the PWM logic circuit to control a pulse width of the first PWM signal.

19. The circuit of claim 18, wherein:
the first PWM signal has a first rising edge; and
the second PWM signal has a second rising edge leading the first rising edge by a time period approximating a response time of the comparator circuit.

20. The circuit of claim 18, wherein:
the first PWM signal has a first falling edge; and
the second PWM signal has a second falling edge synchronous with the first falling edge.

* * * * *